United States Patent
Tachizaki et al.

(10) Patent No.: US 8,982,332 B2
(45) Date of Patent: Mar. 17, 2015

(54) DISTANCE MEASURING DEVICE AND DISTANCE MEASURING METHOD

(75) Inventors: Takehiro Tachizaki, Yokohama (JP); Masahiro Watanabe, Yokohama (JP); Tatsuo Hariyama, Yokohama (JP); Yasuhiro Yoshitake, Yokohama (JP); Tetsuya Matsui, Hitachi (JP); Hirokazu Matsumoto, Tsukuba (JP); Kiyoshi Takamasu, Musashino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/518,727

(22) PCT Filed: Jan. 28, 2011

(86) PCT No.: PCT/JP2011/051812
§ 371 (c)(1),
(2), (4) Date: Aug. 20, 2012

(87) PCT Pub. No.: WO2011/118255
PCT Pub. Date: Sep. 29, 2011

(65) Prior Publication Data
US 2013/0003038 A1   Jan. 3, 2013

(30) Foreign Application Priority Data
Mar. 26, 2010  (JP) ................. 2010-072687

(51) Int. Cl.
 *G01C 3/08* (2006.01)
 *G01S 17/36* (2006.01)
(52) U.S. Cl.
 CPC ..................... *G01S 17/36* (2013.01)
 USPC ....................................... 356/3.1

(58) Field of Classification Search
 USPC .......................................... 356/3.1
 See application file for complete search history.

(56) References Cited

U.S. PATENT DOCUMENTS 4,744,653 A   5/1988  Sano et al.
5,184,246 A * 2/1993  Schwartz et al. .......... 359/216.1
(Continued)

FOREIGN PATENT DOCUMENTS

EP   2 149 778 A1   2/2010
JP   61-138191 A    6/1986
(Continued)

OTHER PUBLICATIONS

Corresponding International Search Report with English Translation dated Mar. 1, 2010 (four (4) pages).
(Continued)

*Primary Examiner* — Isam Alsomiri
*Assistant Examiner* — Vicente Rodriguez
(74) *Attorney, Agent, or Firm* — Crowell & Moring LLP

(57) ABSTRACT

Disclosed is a distance measuring device using an optical comb. In order for the absolute distance to an object to be measured which has a surface with low reflection ratio or a scattering surface and is approximately 10 m apart, to be easily measured with accuracy of 0.1 mm or more using an optical and contactless method, the distance measuring device which measures the distance to the object to be measured is configured such that the distance to the object to be measured is measured by comparing the phase of the beat signal between a light source and a plurality of CW lasers which are reflected or scattered by the object with the phase of the beat signal between the light source and a plurality of CW lasers prior to being irradiated onto the object.

8 Claims, 20 Drawing Sheets

(56) References Cited

U.S. PATENT DOCUMENTS

| | | | |
|---|---|---|---|
| 5,574,592 A * | 11/1996 | Sano et al. | 359/216.1 |
| 5,589,928 A * | 12/1996 | Babbitt et al. | 356/4.1 |
| 7,809,222 B2 * | 10/2010 | Hartl et al. | 385/122 |
| 2005/0185190 A1 * | 8/2005 | Law et al. | 356/484 |

FOREIGN PATENT DOCUMENTS

| | | |
|---|---|---|
| JP | 2004-77979 A | 3/2004 |
| JP | 2006-184181 A | 7/2006 |
| JP | 2008-51674 A | 3/2008 |
| JP | 2010-38552 A | 2/2010 |
| WO | WO 88/08519 A1 | 11/1988 |

OTHER PUBLICATIONS

K. Meiners-Hagen et al., "Multi-Wavelength Interferometry for Length Measurements Using Diode Lasers", Measurement Science Review, vol. 9, sec. 3, No. 1, 2009, (eleven (11) pages).

Yves Salvade et al., "High-Accuracy Absolute Distance Measurement Using Frequency Comb Referenced Multiwavelength Source", Applied Optics, vol. 47, No. 14, May 2008, (six (6) pages).

* cited by examiner $$\Delta \phi = \frac{2d}{\lambda}$$

FIG. 18
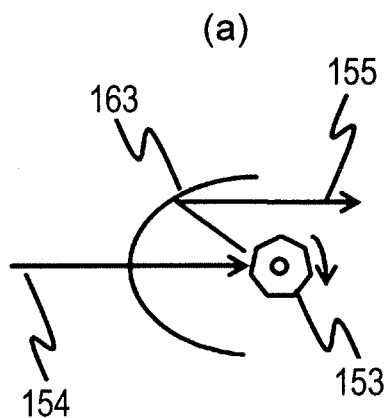
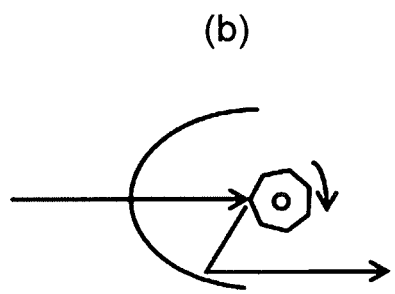
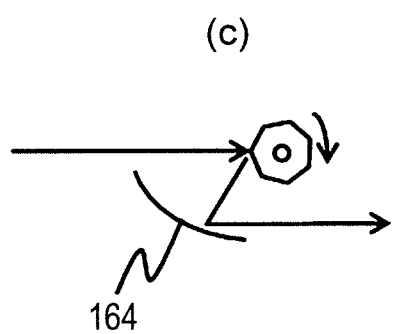

FIG. 19
(a)
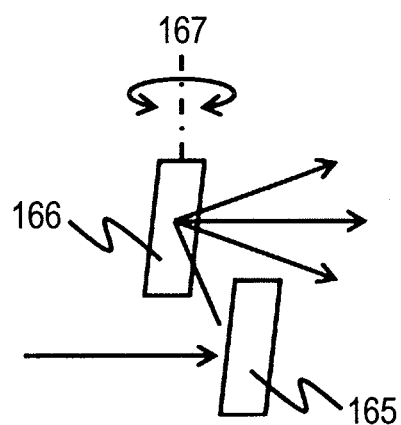
(b)
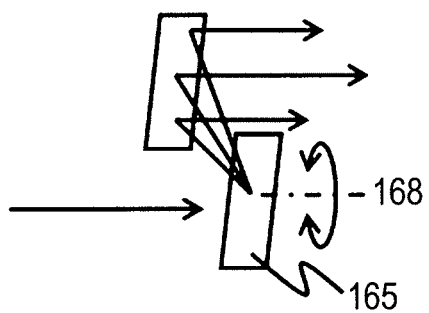

DISTANCE MEASURING DEVICE AND DISTANCE MEASURING METHOD

TECHNICAL FIELD

The present invention relates to a distance measuring device and a distance measuring method for performing precise length measurement and precise distance measurement in a field of manufacturing precision apparatuses and precisely machined members in, for example, mechanical industry and electric industry.

BACKGROUND ART

Many length measuring and distance measuring methods have been conventionally put into practice. In mechanical industry and electric industry, the length measurement and the distance measurement are performed for the purpose of measuring shapes and positions of precision apparatuses and precisely machined members. In the distance measurement and the length measurement, for example, an inspection is performed by measuring shapes and dimensions of precisely machined components before shipment, but this requires performing the measurement while making no contact with an object to be measured. Moreover, there have been demands on the precisely machined components for high measurement accuracy, typically accuracy of 0.1 mm or below. Furthermore, in a case where the object to be measured is large-scaled, as is the case with members of an electric generator or components of an aircraft, also required are conditions such as condition that a distance from a measuring instrument to the object to be measured needs to be increased. In addition, it is desirable that the measurement can be carried out in a work site while member machining and assembly, and this requires not only distance accuracy but also a method which is resistant to disturbance such as mechanical vibration and which has excellent measurement reproducibility and stability.

As the method of distance measurement and length measurement while making no contact with the object to be measured, an optical unit is suitable, and the measurement methods include: for example, a homodyne interference method, a heterodyne interference method, Time of flight (TOF), a Doppler method, and a triangulation method (Non-Patent Literature 1, Non-Patent Literature 2, and Patent Literature 1). Upon the length measurement and the distance measurement, required accuracy, a distance to the object to be measured, measurement time, and device configuration are considered to make selection from among these length measuring and distance measuring methods. For example, in a case where highly accurate distance measurement and shape measurement are required, widely used is a method of making distance measurement by extracting, by the homodyne interference method using a light interferometer, a phase change between light reflected or scattered from the object and light before irradiated to the object to be measured (Non-Patent Literature 1 and Non-Patent Literature 2). This method can achieve measurement with an accuracy of approximately one hundredth of a wavelength of used light, but due to reasons, for example, that the optical interference system is vulnerable to disturbance, a relatively large-scaled device is required, and that much time is required for measuring absolute distance to the object to be measured, applications in actual work sites in the mechanical industry and an electric factory are limited.

The Time of Flight is a method of by using pulse-like light, measuring absolute distance to the object to be measured based on a difference between time at which the light is emitted from a light source and time at which the light reflected or scattered at the object to be measured is detected by a photodetector. Due to simple principles, the distance measurement can be made in a relatively simple manner, but due to fast light propagation speed, there is limitation on frequency responsiveness of the photodetector and a circuit, and current measurement accuracy is approximately millimeters. It is not satisfactory for measuring the shapes and the positions of the precision and precisely machined members, and thus applications in work sites are limited.

The Doppler method is a method capable of measuring a moving speed and vibration of an object to be measured with an accuracy of approximately 0.05 μm/s based on a frequency change of the light reflected or scattered at the object to be measured. With the Doppler method, measured amounts are the moving speed and the vibration of the object to be measured, and the distance to the object to be measured is obtained by multiplying a speed of moving from a distance reference. A relative position from the distance reference can be measured with relatively high accuracy and device configuration is also relatively simple, and thus it is widely used in the mechanical industry and the electric industry. However, it is not suitable for measuring an absolute distance to the object to be measured and is also not suitable for the shape method since it is a method of obtaining a change in the relative distance from the reference distance by multiplying the moving speed.

The triangulation method is widely used in construction works, etc., but is less frequently used in fields of the mechanical industry and the electric industry for reasons, for example, that it can simply measure an absolute distance and a position but requires a large-scaled device for obtaining required measurement accuracy.

The tracking method is a method of measuring a shape of an object to be measured by use of the aforementioned distance measurement unit. In the tracking, a target is arranged on a surface of the object to be measured, light emitted from a light source is reflected on the target, and a distance to the target is measured by using returning light. It is a method of measuring the distance at different points of the target arranged on the surface of the object to be measured and then linking together these points to obtain a shape of the object to be measured. Since the target is arranged on the object to be measured, an amount of light returning to a photodetector can be increased and a distance from the light source to each target can be measured with high accuracy. However, since the target needs to be arranged on the surface of the object to be measured, preparation is very complicated. Moreover, since only the number of points of the target can be measured, the measurement points are spatially discrete, making it very difficult to recognize a small shape change of the object to be measured. Thus, it is used only in extremely limited fields of the mechanical industry and the electric industry.

As described above, in the work sites of the mechanical industry and the electric industry, it is difficult to measure the absolute distance to the object to be measured and the shape with high accuracy in actual work environment. However, on the other hand, for the purpose of achieving higher function of industrial products and their safety improvement, product sophistication and accuracy improvement are underway, and demands for measuring the absolute distance to the object to be measured and the shape thereof with high accuracy have been increased year after year.

CITATION LIST

Patent Literature

Patent Literature 1: Japanese Patent Application Laid-Open Publication No. 2008-51674
Patent Literature 2: Japanese Patent Application Laid-Open Publication No. H1-503172

Non-Patent Literature

Non-Patent Literature 1: Applied Optics Introductory Optical Measurement (Maruzen, by Toyohiko Yatagai, ISBN: 4-621-07530-6)
Non-Patent Literature 2: "Multi-Wavelength Interferometry for Length Measurements Using Diode Lasers", K. Meiners-Hagen et al., Measurement Science Review, vol. 9. sec. 3. No. 1 2009 p 16.
Non-Patent Literature 3: "High-accuracy absolute distance measurement using frequency comb referenced multiwavelength source" Y. Salvade et al., Applied Optics vol. 47 (14), p 2715 (2008).

SUMMARY OF INVENTION

Technical Problem

Thus, distance measurement and length measurement using a light source called an optical comb have been developed and have come under the spotlight in recent years. Here, the optical comb is light composed of a large number of coherent frequency components. The optical comb is mainly obtained by a mode-locked pulse laser, and is characterized in: as shown in FIG. 1, that the frequency components 1 (each frequency component is called mode) are at equal intervals (an interval 3 between the n-th mode and the (n+1)-th mode; that as many as approximately $10^5$=100000 modes are included in a full width at half maximum of an spectrum 2; and that the mode interval 3 is precisely controllable by, for example, use of an outside frequency reference.

As shown in a schematic diagram of FIG. 2, as a result of detecting light with a photodetector 7, a frequency of a detected signal is typically a difference frequency component 6 (|f1−f2|) of frequencies (f1 and f2) of light as input since an upper limit of a bandwidth of the photodetector has not reached the frequency of the light. As a result of similarly detecting the optical comb composed of a large number of modes with a photodetector, the frequency components of each mode is not detected and, for example, only the low frequency components falling in a band of the photodetector in interference components between the modes of the optical comb as shown in FIG. 3 are detected. The interference between the modes included in the optical comb is called self beat 8, and its frequency reflects characteristics of the frequency of the optical comb and is characterized by having a frequency interval equal to the mode interval 3. For example, in case of an optical comb whose mode interval is 50 MHz, the interval 3 between the adjacent modes n and (n+1) is 50 MHz, an interval 4 between the n-th mode and the second next mode (n+2) is 100 MHz, and an interval 5 from the further next mode (n+3) is 150 MHz. A self beat observed in this case has, as shown in FIG. 3, a minimum frequency of 50 MHz, which is equal to the mode interval 3, the frequencies increase in order of 100 MHz attributable to the interference between the two adjacent modes and 150 MHz attributable to the interference with the third mode.

The distance measurement and length measurement using the optical comb having the characteristics as described above are performed by measuring a phase of the self beat. That is, as shown in FIG. 4, the optical comb 9 is divided into two with a beam splitter 10, one of the two is defined as reference light 11 and a phase of a beat of a given frequency is observed, and the other one of the two is defined as measuring light 12 and is irradiated to an object to be measured 13 and a phase of the returning measuring light of the same frequency as that of the reference light is measured. The measured phases of the beats of the same frequency are compared with each other, and based on a difference 14 between these phases, a difference in length of a light path after the light division (twice distance d15 from a spot at which the measuring light is diverged from the reference light in FIG. 4 to the object to be measured) is obtained. Accuracy of the length measurement and the distance measurement is determined by accuracy of detection of a frequency and a phase of a used beat, and for example, in a case where by using a beat of 50 MHz, its phase is measured with an accuracy of $\frac{1}{100}$, a distance d15 to the object to be measured can be determined with a resolution of 60 mm.

In a case where this measurement is performed with the optical comb, as many preferable frequencies for the measurement as are required can be selected from among the large number of self beats, and the absolute distance to the object to be measured can be obtained with high accuracy through making measurement once. This can be understood as follows. As shown in FIG. 5, in a case where distance measurement is performed with a wave 16 of a given wavelength l1 to obtain a phase within one cycle as a1 rad 17, an actual phase is a1+2π×n (where n is an unknown integer), thus leaving uncertainty of 2π×n, and thus it is not certain whether the distance to the object to be measured is |1×(a1/2π) or |1×(a1/2π+1) or |1×(a1/2π+1). That is, length measurement and distance measurement with a distance longer than a wavelength cannot be performed only with a phase. Introduced here is a wave 18 of an even longer wavelength l2 (|1<|2). As is the case with the above, in a case where a phase within one cycle of a wave of the wavelength l2 is determined as a2 rad 19, |2×(a2/2π+m) can be determined as a distance in the distance measurement with l2. Although uncertainty m still exists, but since |1>|2, the distance can be determined in a wide range through measurement with l1. Moreover, a position of the object to be measured is determined as |2×(a2/2π+m) in the measurement with l2, uncertainty n by measurement with l1 is determined as n=(l2×a2/2π). Eventually, as a result of simultaneous measurement with l1 and l2, uncertainty on an individual wavelength basis remains but the accuracy can be improved to |1/l2 compared to that measured by only l2, which permits enlargement of a measurement range by l2/l1 compared to that measured with only l1. As described above, the distance to the object to be measured can be measured by using a plurality of wavelengths, increasing the measurement range by measuring the plurality of beats, and improving resolution.

More specifically, for example, assume a case where a self beat signal of 5 GHz and a self beat signal of 50 MHz are measured with a phase resolution of $\frac{1}{100}$. Then from the self beat of 50 MHz, a distance can be determined with a measurement range of 600 mm and with a resolution of 60 mm, and further from the self beat of 5 GHz, its distance resolution can be improved to 0.6 mm. In a case where the optical comb is used, a large number of self beats are present in an MHz-THz band, and therefore the distance to the object to be measured can be uniquely determined with high accuracy by appropriately selecting the self beat. The uniquely determined distance to the object to be measured is expressed as "absolute distance".

As described above, the length measurement and distance measuring method by use of the optical comb can measure the absolute distance to the object to be measured with high accuracy in one measurement. However, in the work sites of the mechanical industry and the electric industry, there are the following problems but they are still remaining:

(A) Insufficient light amount
(B) Difficulty to favorably extract a signal to noise ratio (SN ratio) with only required beats from the large number of self beats
(C) Request on the object to be measured In view of the problems described above, the present invention addresses the above (A) and (B) in particular, and provides a distance measuring device and a distance measuring method of simply measuring an absolute distance to an object to be measured having a surface with a low reflection rate or a scattering surface and located distantly by approximately 10 mm with an accuracy of 0.1 mm or above through an optical, contactless method.

Solution to Problem

Summary of representatives of the present invention disclosed herein will be described briefly as follows.

(1) A distance measuring device measuring a distance to a target object includes: a light source oscillating light at constant frequency intervals; a plurality of CW laser oscillators which oscillates a plurality of CW lasers controlled in a manner such as to provide a constant frequency difference from a frequency of the light source; a unit irradiating the plurality of CW lasers to the target object; a unit spatially scanning the plurality of CW lasers on a surface of the target object; a unit observing a beat between the light oscillated from the light source and the plurality of CW lasers reflected or scattered from the target by the irradiating; a unit generating a beat signal of the observed beat signal between the light oscillated from the light source and the plurality of CW lasers reflected or scattered from the target by the irradiating; a unit extracting a phase of the generated beat signal of the observed beat signal between the light oscillated from the light source and the plurality of CW lasers reflected or scattered from the target by the irradiating; and a unit extracting a phase of a beat signal of a beat signal between the light oscillated from the light source and the plurality of CW lasers before irradiating the target object, wherein the distance to the target object is measured by comparing the phase of the beat signal of the beat signal between the light oscillated from the light source and the plurality of CW lasers reflected or scattered from the target object by the irradiating and the phase of the beat signal of the beat signal between the light oscillated from the light source and the plurality of CW lasers before irradiating the target object.

(2) A distance measuring device measuring a distance to a target object includes: a light source oscillating light at constant frequency intervals; a plurality of CW laser oscillators which oscillates a plurality of CW lasers controlled in a manner such as to provide a constant frequency difference from a frequency of the light source; a unit irradiating the plurality of CW lasers to the target object; a unit spatially scanning the plurality of CW lasers on a surface of the target object; a unit observing a beat between the light oscillated from the light source and the plurality of CW lasers reflected or scattered from the target by the irradiating; a unit generating a beat signal of the observed beat signal between the light oscillated from the light source and the plurality of CW lasers reflected or scattered from the target by the irradiating; a unit extracting a phase of the generated beat signal of the observed beat signal between the light oscillated from the light source and the plurality of CW lasers reflected or scattered from the target by the irradiating; and a unit extracting a phase of the beat signal of the beat signal between the light oscillated from the light source and the plurality of CW lasers before irradiating the target object, wherein the distance to the target object is measured by comparing the phase of the beat signal of the beat signal between the light oscillated from the light source and the plurality of CW lasers reflected or scattered from the target object by the irradiating and the phase of the beat signal of the beat signal between the light oscillated from the light source and the plurality of CW lasers before irradiating the target object.

(3) A distance measuring device measuring a distance to a target object includes: a plurality of CW laser oscillators which oscillates a plurality of CW lasers whose oscillation frequencies are variable; a unit acquiring a beat by the plurality of CW lasers; a frequency stabilizing unit keeping constant a difference between the oscillation frequencies of the plurality of CW lasers; an optical system irradiating the CW lasers to the target object; an optical system scanning the plurality of CW lasers on a surface of the target object; an optical system receiving the plurality of CW lasers reflected or scattered from the target object by the irradiation of the plurality of CW lasers; a unit extracting a beat between the plurality of CW lasers reflected or scattered from the target object by the irradiation of the plurality of CW lasers; a unit extracting a phase of the beats between the plurality of CW lasers reflected or scattered from the target object by the irradiation of the plurality of CW lasers; and a unit calculating the distance to the target object based on the extracted phase, wherein the distance to the target object is measured based on a difference between the phase of at least either one of the reflected light or the scattering light from the target object and a phase before irradiating the target object.

(4) A distance measuring device measuring a distance to a target object uses: a plurality of CW laser oscillators which oscillates a plurality of CW lasers whose oscillation frequencies are variable; a unit acquiring a beat between the plurality of CW lasers; a frequency stabilizing unit keeping constant a difference between the oscillation frequencies of the plurality of CW lasers; an optical system irradiating the CW lasers to the target object; an optical system scanning the plurality of CW lasers on a surface of the target object; an optical system receiving the plurality of CW lasers reflected or scattered from the target object; a unit extracting a beat between the plurality of CW lasers reflected or scattered from the target object; a unit extracting a phase of the beat between the plurality of CW lasers reflected or scattered from the target object; and a unit calculating the distance to the target object based on the extracted phase, the distance measuring device measuring the distance to the target object based on a difference between a phase of the plurality of CW lasers at least one of the reflected light or the scattering light from the target object and a phase of the plurality of CW lasers before irradiating the target object.

(5) A distance measuring device measuring a distance to a target object includes: a light source CW laser having a plurality of oscillation frequencies; a unit acquiring a beat of the light source; an optical system irradiating the target object with light emitted from the light source; an optical system scanning on a surface of the target object the light emitted from the light source; an optical system receiving the light reflected or scattered from the target object by the irradiating;

a unit extracting a beat between the lights emitted from the light source and reflected or scattered from the target object; a unit extracting a phase of the beat between the lights emitted from the light source and reflected or scattered from the target object; and a unit calculating the distance to the target object based on the extracted phase, wherein the distance to the target object is measured based on a difference between the phase of at least one of the reflected light or the scattering light from the target object and a phase of the light emitted from the light source and before irradiating the target object.

(6) A distance measuring method measuring a distance to a target object using a distance measuring device which includes: a light source oscillating a CW laser having a plurality of oscillation frequencies; a unit acquiring a beat of the light source; an optical system irradiating a target object with light emitted from the light source; an optical system scanning on a surface of the target object with the light emitted from the light source; an optical system receiving light reflected or scattered from the target object by the irradiation of the light; a unit extracting a beat between the lights emitted from the light source and the light reflected or scattered from the target object; a unit extracting a phase of the beat between the lights emitted from the light source and the light reflected or scattered from the target object; and a unit calculating the distance to the target object based on the extracted phase of the beat, the method comprising the steps of: calculating a difference between a phase of at least one of the reflected light or the scattering light from the target object and a phase of the light before irradiating the target object; and measuring the distance to the target object based on the calculated difference of the phases.

(7) A distance measuring device measuring a distance to a target object includes: a light source oscillating light at constant frequency intervals; a plurality of CW laser oscillators which oscillate a plurality of CW lasers controlled in a manner such as to provide a constant frequency difference from a frequency of the light source; a light dividing unit dividing light emitted from the plurality of CW lasers into measuring light and reference light; a first detection unit irradiating a target object with the measuring light obtained by the light dividing unit, and detecting reflected light or scattering light from the target object; a second detection unit detecting the reference light and the light from the light source; and a processing unit calculating the distance to the target object by comparing a phase of a beat signal between the light from the light source and the reflected light or the scattering light from the target object by the irradiation of the measuring light, which is calculated based on a signal obtained from the first detection unit, and a phase of a beat signal between the light from the light source and the reference light, which is calculated based on a signal obtained by the second detection unit.

Advantageous Effects of Invention

The present invention can provide a distance measuring device and a distance measuring method of simply measuring an absolute distance to an object to be measured having a surface with a low reflection rate or a scattering surface and located distantly by approximately 10 m with an accuracy of 0.1 mm or above through an optical, contactless method.

BRIEF DESCRIPTION OF THE DRAWINGS

FIG. 18 is a diagram showing an example of configuration of an optical system that scans measuring light.
FIG. 19 is a diagram showing an example of configuration of an optical system that scans measuring light.

DESCRIPTION OF EMBODIMENTS

The problem (A) described above can be solved by increasing intensity of the used optical comb, but a great increase in light intensity in an actual work site cannot be expected due to security restriction. Thus, to solve this problem, the present invention suggests a method of increasing only light required for length measurement while keeping within a safe range a total amount of light irradiated to an object to be measured.

A description will be given with reference to the drawings.

Figure 6:
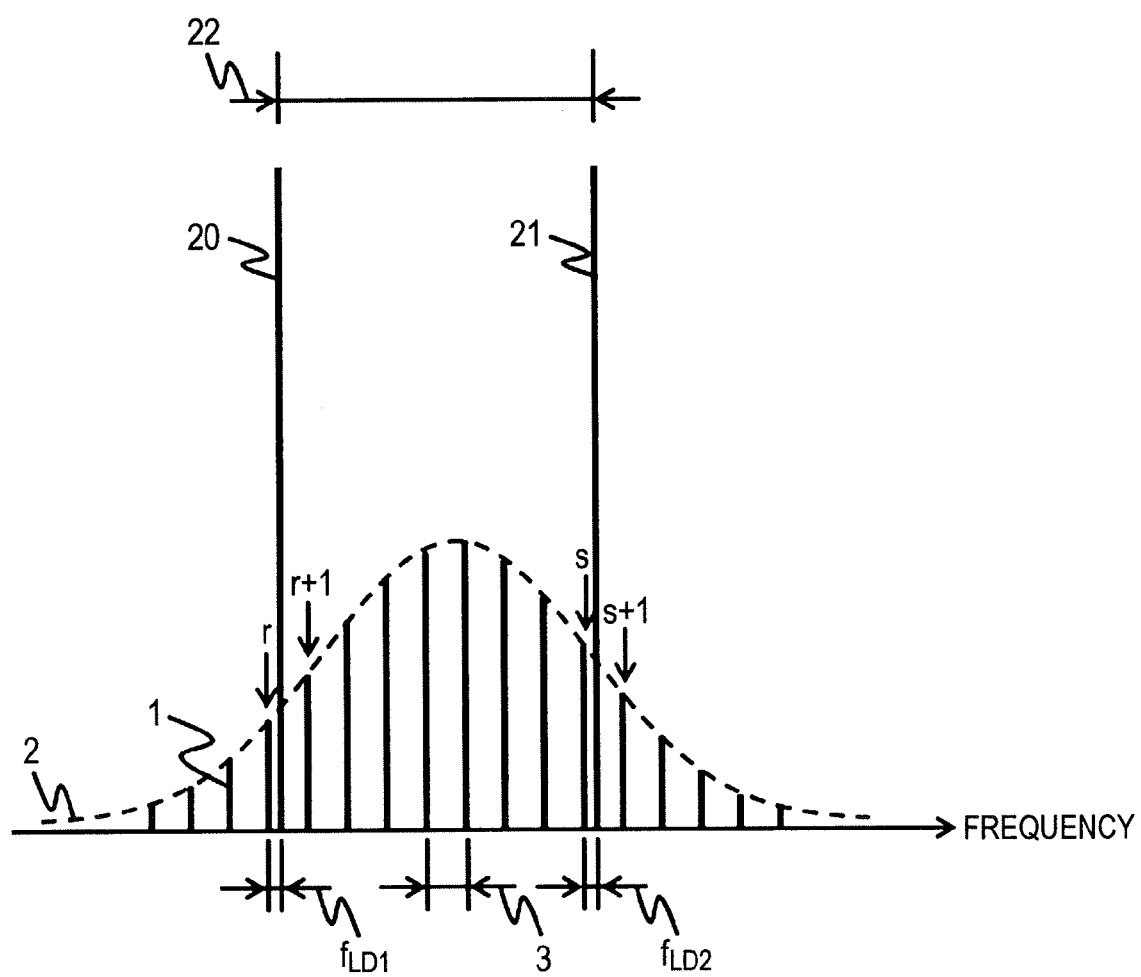
FIG. 6 is a pattern diagram showing a spectrum of a laser controlled in a manner such as to provide constant relationship between the optical comb and the optical comb and frequency.

In the invention, two sets of CW lasers capable of controlling not only an optical comb but also a wavelength are used. FIG. 6 shows relationship between a frequency spectrum of these CW lasers and a frequency spectrum of the optical comb. Each mode 1 of the optical comb has distribution of a spectrum 2 and each mode interval 3 is constant. Frequencies of the two sets of CW lasers are adjusted within a range in which this optical comb is distributed. The frequency 20 of the first CW laser is fixed between a r-th mode and a (r+1)-th mode, and the frequency is defined as a frequency fLD1 that is higher than the r-th mode by fr-LD1. The frequency 21 of the other second CW laser is fixed between an s-th mode and an (s+1)-th mode of the optical comb, and the frequency is defined as a frequency fLD2 that is higher than the s-th mode by external force Fs-LD2. A frequency difference 22 between the frequency 20 of the first CW laser and the frequency 21 of the second CW laser is fLD2−fLD1. As described above, to fix a constant frequency difference between the frequency of the optical comb and the oscillation frequency, used as the first and second CW lasers are CW lasers whose frequency is variable and whose oscillation spectrum width is sufficiently narrower than the mode interval 3.

In a case where CW lasers whose oscillation frequency difference with respect to the mode of the optical comb is fixed at a constant value as described above, by irradiating only the two CW lasers without irradiating the optical comb to an object to be measured, a phase of a beat corresponding to the frequency difference 22 of the CW lasers can be measured to perform length measurement. In this case, compared to a case where the optical comb is irradiated to the object to be measured, intensity of light used for the measurement can be made stronger than that in case of the optical comb only and also total intensity of the light irradiated to the object to be measured can be weakened, permitting usage in actual work sites.

Figure 7:
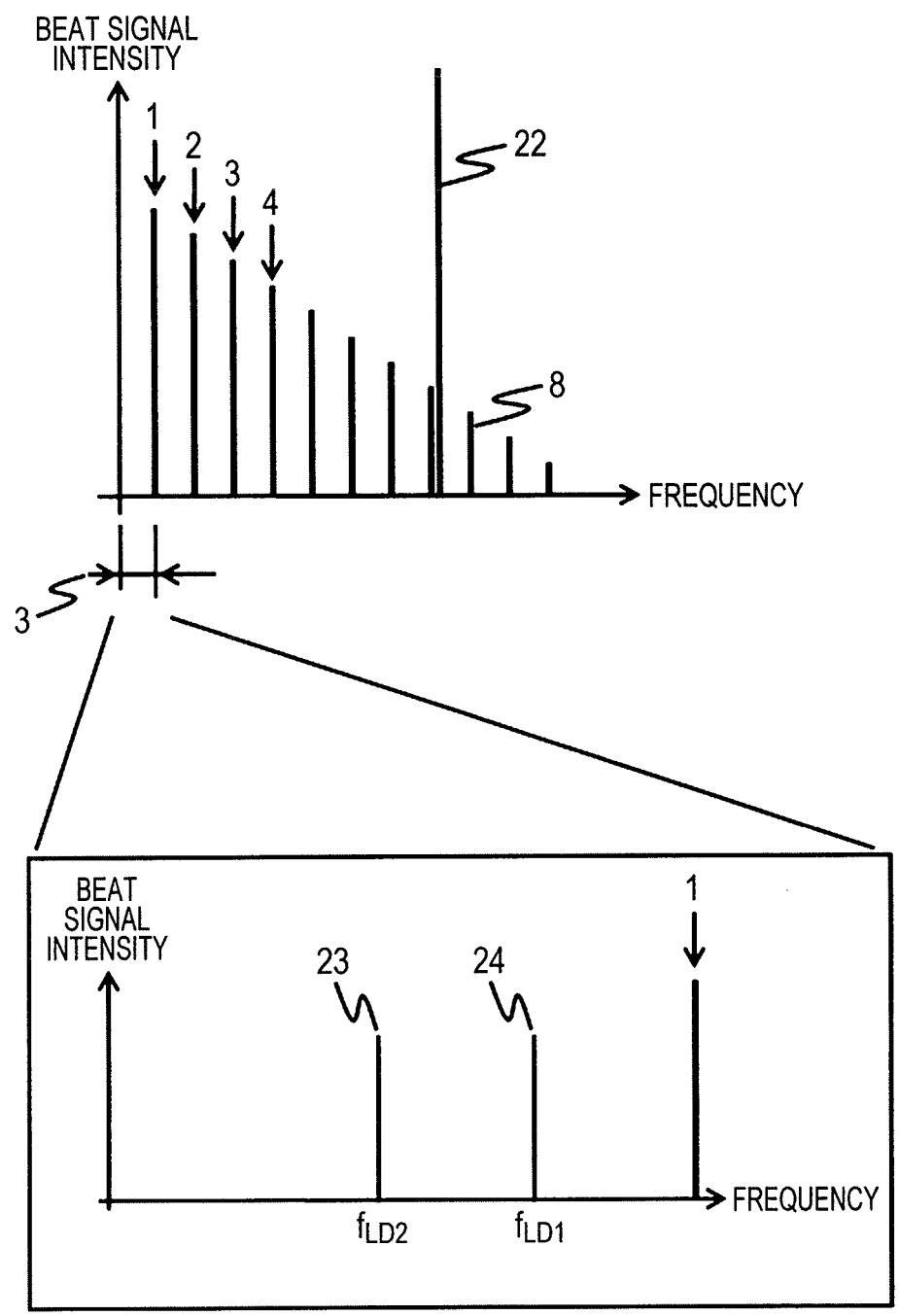
FIG. 7 is a pattern diagram showing a frequency spectrum of a beat signal generated by the optical comb and a CW laser.
Figure 8:
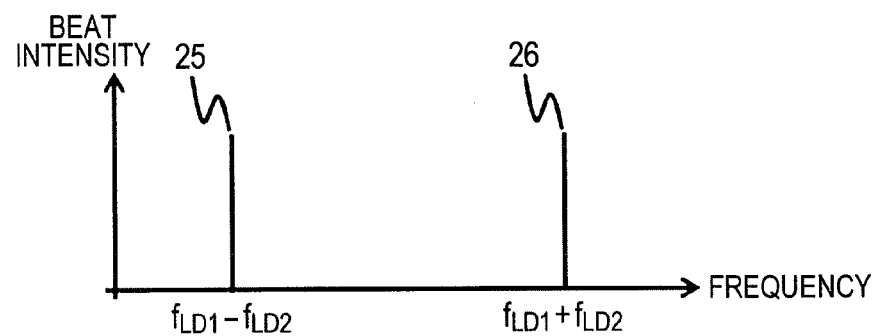
FIG. 8 shows a frequency spectrum of a beat obtained by mixing together beats of the optical comb and the CW laser.

FIG. 7 shows a spectrum in a case where the optical comb and the CW laser are detected together by a photodetector. Specifically, self beats 8 of the optical comb are observed at equal intervals from a low frequency side, a mode corresponding to the frequency difference 22 of the CW lasers is observed in a manner such as to be superimposed on the aforementioned spectrum, and also beats 23 and 24 of the optical comb and the CW lasers are observed. Here, frequencies of the beats 23 and 24 are fr-LD1 and fs-LD2. To perform length measurement and distance measurement with high accuracy, the frequency difference 22 between the CW lasers needs to be increased to provide high beat frequencies in obtaining their phases need to be obtained, but providing the high frequencies causes limitation on a band of the photodetector and difficulty in extraction without phase disturbance. Thus, in the invention, a beat between the beats 23 and 24 of the optical comb and CW lasers is generated to obtain a phase of the beat 22 between the CW lasers. First, from a frequency signal obtained from the photodetector and shown in FIG. 7, only the beats 23 and 24 are extracted separately from each other. Then the beat 23 and the beat 24 are electrically mixed together to generate betas 25 and 26 of the beat 23 and the beat 24. Finally, only either of the beat 25 and the beat 26 is extracted by a filter. As described above, an operation of extracting a beat of a beat is performed for both of the reference light and the measuring light, and phases of beats between the beats between the optical comb and the CW lasers are compared to obtain a distance to the object to be measured. Here, the beats 25 and 26 between the beats between the optical comb and the CW lasers, as shown in FIG. 8, correspond to a frequency difference and a sum frequency of the beats 23 and 24 of the optical comb and the CW lasers, and use of either one includes the same information.

Figure 9:
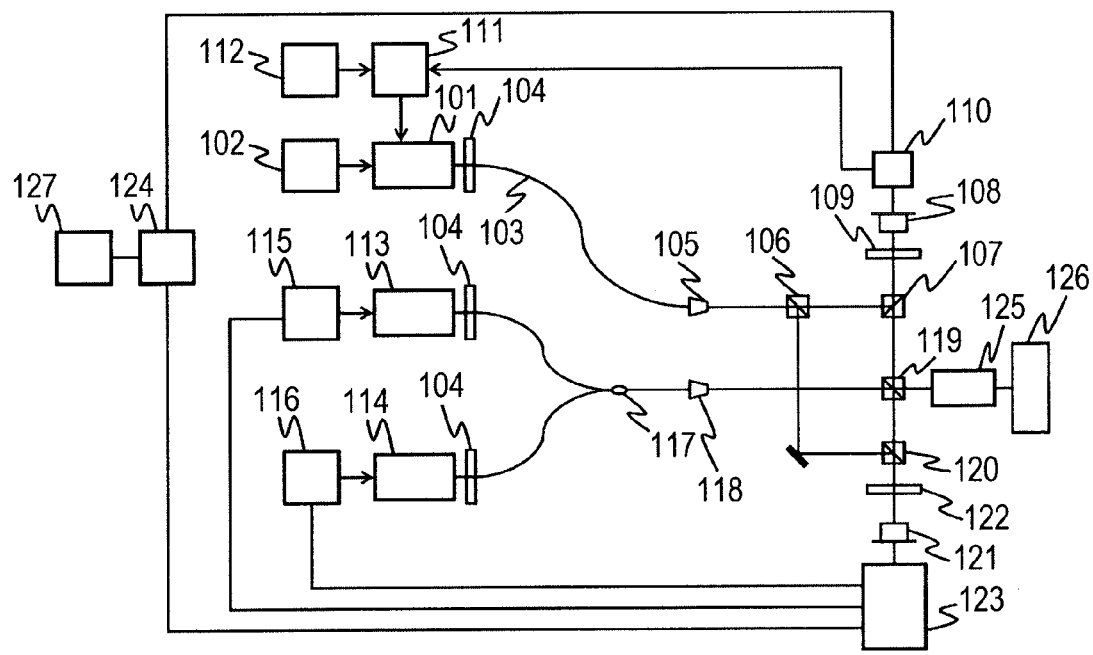
FIG. 9 is a pattern diagram showing configuration of a length and distance measuring device using for the optical comb a CW laser whose frequency is locked.

Next, referring to FIG. 9, an example of a device performing the length measurement and distance measurement described above will be described.

Figure 1:
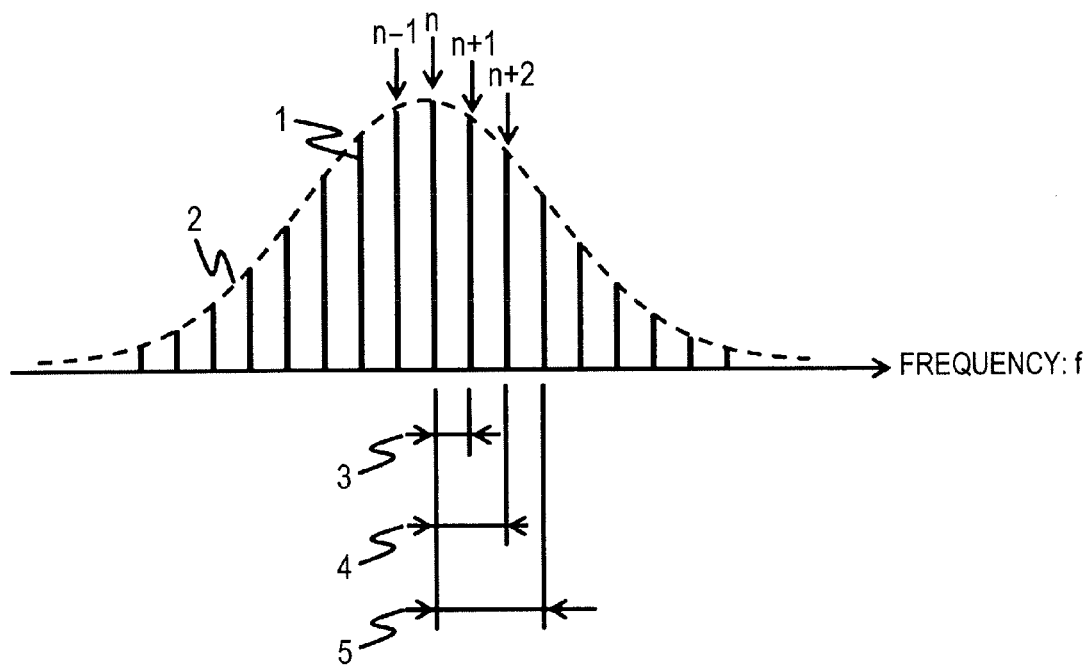
FIG. 1 is a schematic diagram of a spectrum of an optical comb.
Figure 2:
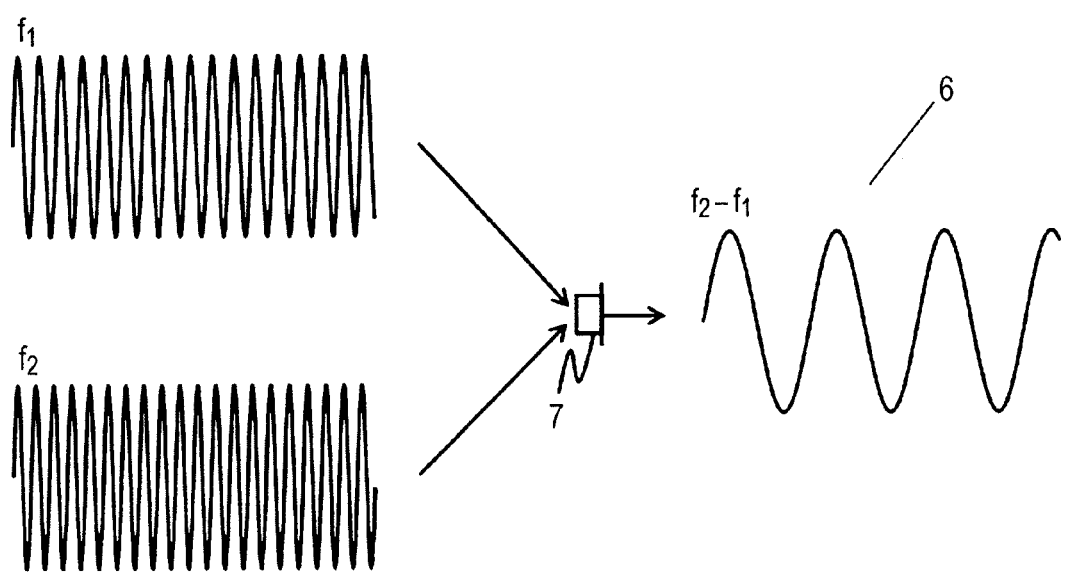
FIG. 2 is a schematic diagram showing how a beat signal is generated by a photodetector.
Figure 3:
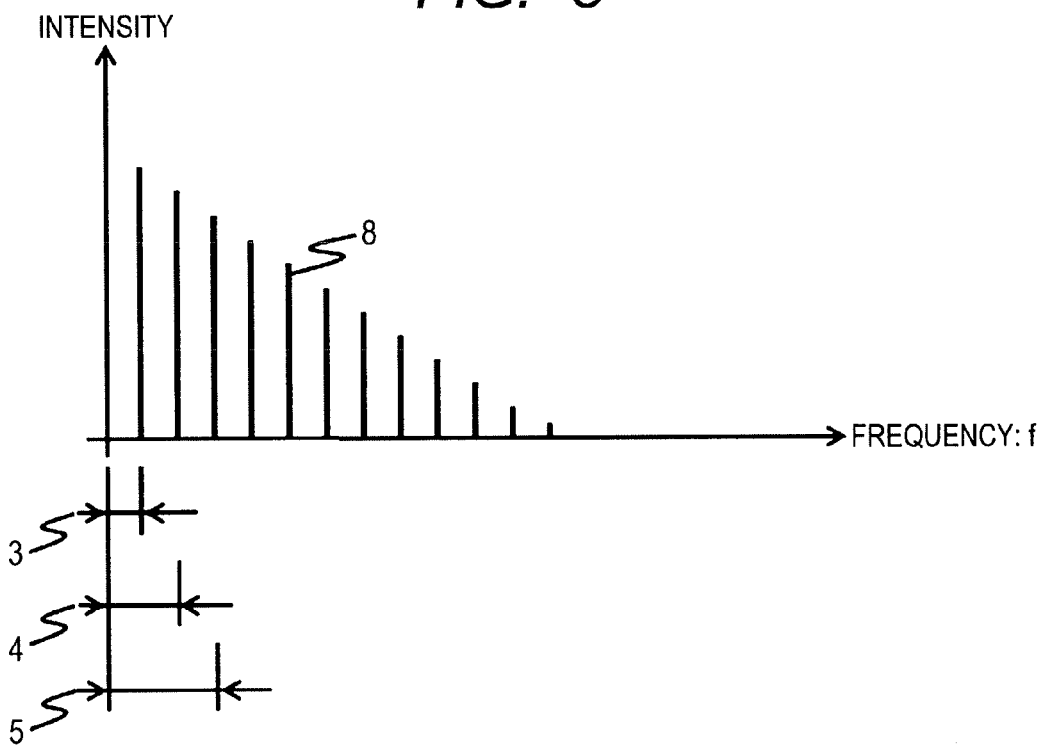
FIG. 3 is a schematic diagram showing a frequency spectrum of a beat signal generated from an optical comb.
Figure 4:
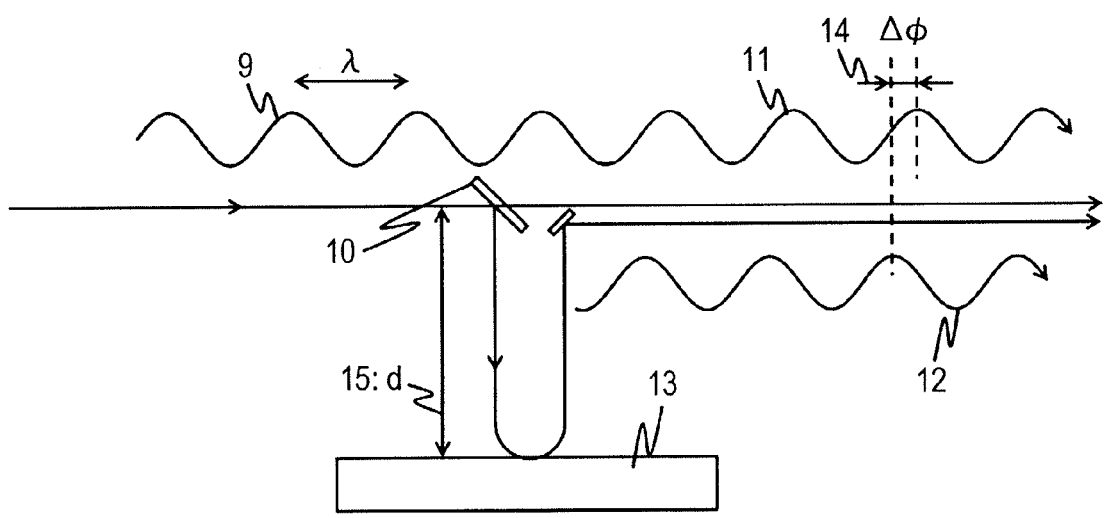
FIG. 4 is a schematic diagram showing relationship between a distance from an object to be measured and a phase difference between measuring light and detected light.
Figure 5:
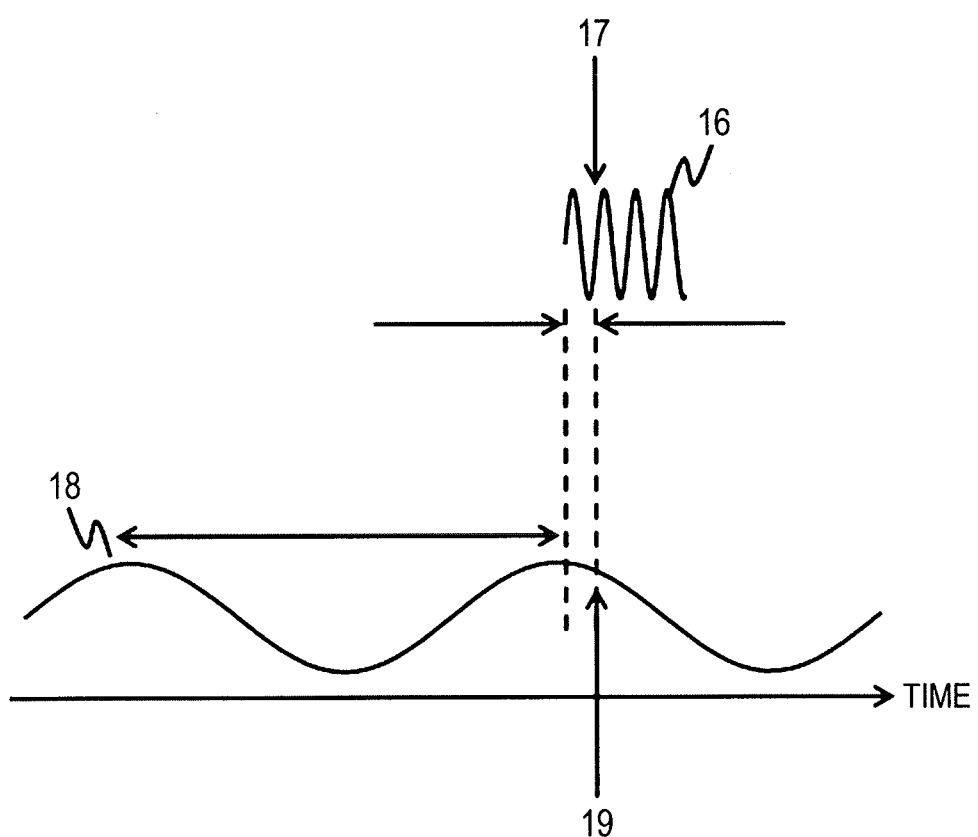
FIG. 5 shows relationship between an improvement in accuracy of measurement and measurement range enlargement by two beats.

An optical comb oscillator 101 is excited by a CW laser 102 and guided to an optical fiber 103. Inserted in the optical fiber 103 is an isolator 104 so that oscillation of the optical comb oscillator 101 is not destabilized by reflected light or scattering light. Another end of the optical fiber 103 is connected to an output coupler 105, and the optical comb is outputted from the optical fiber 103 through the output coupler 105. The optical comb outputted from the optical fiber 103 through the output coupler 105 is divided into two by a beam splitter 106, and is reflected by a beam splitter 107, and is guided to a photodetector 108. The photodetector 108 detecting the optical comb outputs spectra as shown in FIG. 3. Arranged in front of the photodetector 108 is a filter 109 which permits transmission of only light of a particular wavelength. A beat signal outputted from the photodetector 108 is amplified by a circuit 110 and guided to a circuit 111.

Provided to the circuit 111 is, as input, a signal of a constant frequency from a frequency reference 112. The circuit 111 extracts only a beat signal corresponding to the mode interval 3 of the optical comb, compares the signal of the constant frequency guided from the frequency reference 112 and the frequency of the mode interval 3, and outputs a frequency difference therebetween. A outputted signal of the frequency difference is guided to the optical comb oscillator 101 and used so as to keep the oscillation frequency of the optical comb constant.

The CW lasers used for measurements of length and distance to the object to be measured are 113 and 114 in this embodiment. The first CW laser 113 and the second CW laser 114 are respectively driven and controlled by laser drivers 115 and 116. A frequency of the first CW laser 113 is lower than a frequency of the second CW laser 114, an oscillation frequency of the first CW laser 113 corresponds to 20 of FIG. 6, and an oscillation frequency of the second CW laser 114 corresponds to 21 of FIG. 6. Lights oscillated from the first CW laser 113 and the second CW laser 114 are guided by respective optical fibers, and the two optical fibers are guided into one optical fiber by a coupler 117. Also here, in both of them, isolators 104 are respectively inserted so as to avoid reflected light and scattering light and stabilize the oscillation of the CW lasers. The CW laser coupled by the coupler 117 is outputted from an output coupler 118. The discharged CW laser is divided by a beam splitter 119, and one of the two is used as measuring light and the other one is used as reference light. The reference light is reflected by the beat splitter 119, is then coupled to the optical comb by a beam splitter 120, and is guided to a photodetector 121. Arranged in front of the photodetector 121 is a filter 122 that permits transmission of only light of a particular frequency. Beat signals of the optical comb and the CW lasers detected by the photodetector 121 are subjected to amplification, mixing, and frequency filtering by a circuit 123.

In the circuit 123, the beats 23 and 24 of the optical comb and the CW lasers are extracted through filtering, and they are mixed together to generate beats 25 and 26. One of the beats 25 and 26 is extracted through filtering and guided as a reference signal for the measuring light to a phase frequency comparator 124. The beats 23 and 24 of the optical comb and the CW laser are guided to laser drivers 115 and 116 for stabilizing the oscillating frequency of the CW laser. That is, the beat 23 is guided to the laser driver 115 and the beat 24 is guided to the laser driver 116.

The other one of the CW lasers divided by the beat splitter 119 is transmitted through an optical system 125 and irradiated to an object to be measured 126. The measuring light reflected or scattered by the object to be measured is collected by the optical system 125, is reflected by the beat splitter 119, is made to be coaxial with the optical comb by a beam splitter 107, is transmitted through the filter 109, and reaches the photodetector 108. The beats 23 and 24 of the optical comb and the CW lasers detected by the photodetector are extracted separately from each other through filtering at the circuit 110. The extracted beat signals 23 and 24 are mixed together to generate beat signals 25 and 26, and one of them is extracted through filtering. A frequency to be extracted is the same as a frequency of a signal guided from the circuit 123 to the phase frequency comparator 124. The extracted beat signals are guided to the phase frequency comparator 124 and compared with the reference signal to calculate their phases. The calculated phases are converted into distances in an arithmetic unit 127 and the distances obtained through the conversion are displayed on a display unit (not shown).

Next, each of components shown in FIG. 9 will be described referring to FIGS. 9 to 19.

Figure 10:
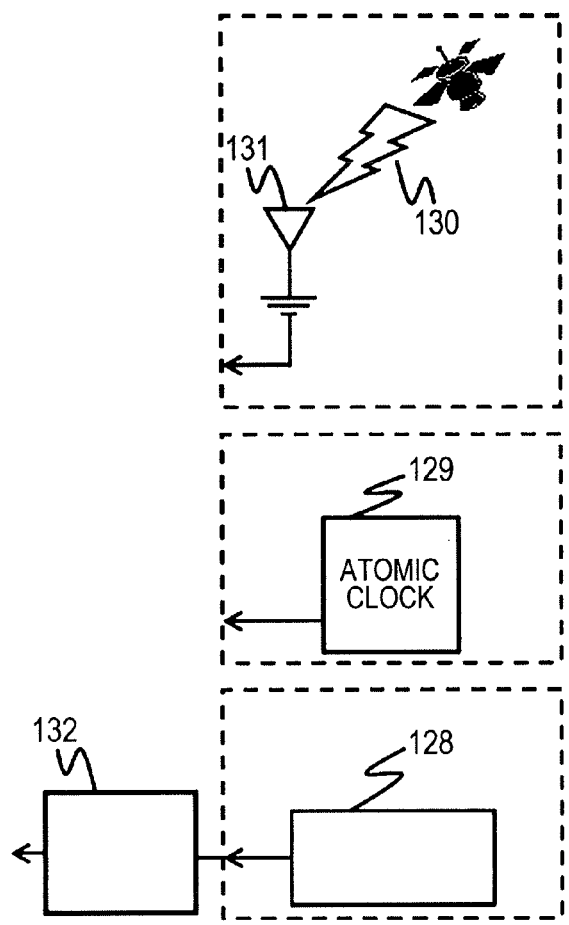
FIG. 10 is a diagram showing one example of a frequency source.

FIG. 10 shows one example of the frequency reference 112. The frequency reference 112 is a frequency source that generates to outside a constant frequency close to the mode interval 3 of the optical comb. The frequency reference 112 is one of a signal from a stabilized oscillator 128, a signal from an atomic clock 129, or a GPS signal 130 received by an antenna 131, and has a function of reducing a frequency signal received from one of the signal sources to a frequency close to the mode interval 3 of the optical comb by a frequency divider 132. Here, for the stabilization oscillator 128, any of a quartz resonator, an acoustic wave oscillator, a phase-locked oscillator, a rubidium crystal oscillator, etc. is used in accordance with required measurement accuracy.

Figure 11:
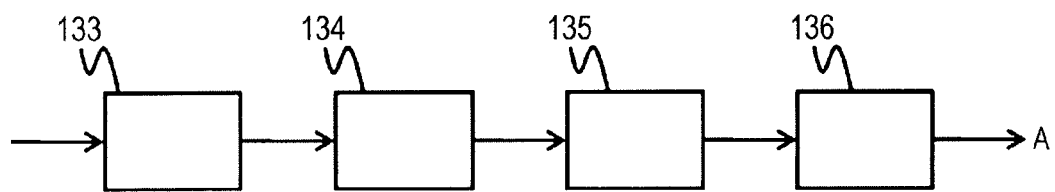
FIG. 11 is a diagram showing an example of configuration of a laser driver.

FIG. 11 shows a configuration example of the laser drivers 115 and 116.

For a signal of the frequency fr-LD1 or Fs-LD2 transmitted from the circuit 123, the frequency is decreased by a frequency divider 133, the frequency is converted into a proportional voltage by an FV converter 134, and a voltage applied to a CW laser driver 136 is controlled by a P1 controller 135 so that an output voltage of the FV converter 134 becomes constant. Such configuration can keep the frequency fr-LD1 or Fs-LD2 constant and can keep the frequency difference 22 between the CW lasers 113 and 114 constant.

Figure 12:
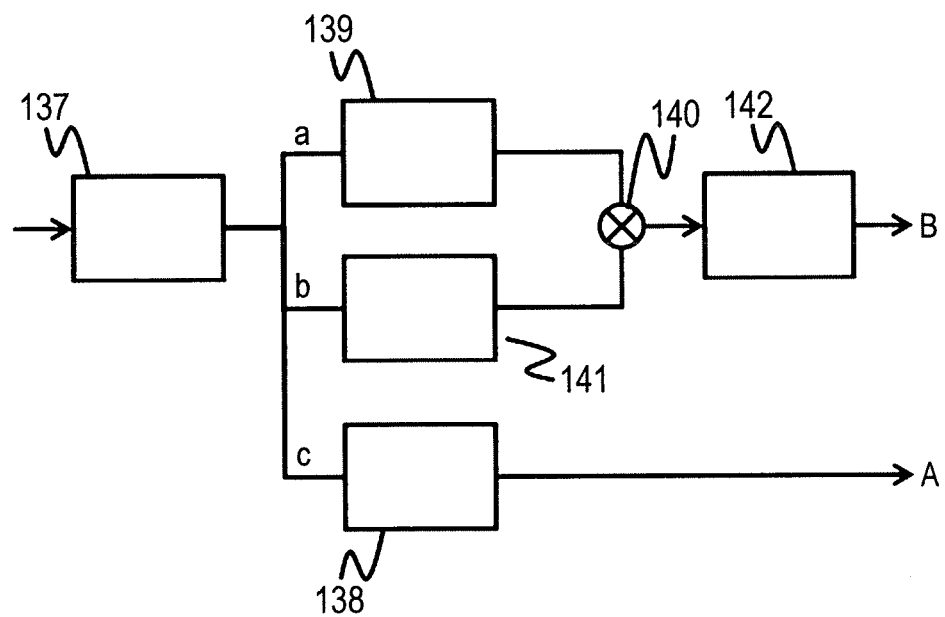
FIG. 12 is a diagram showing an example of circuit configuration.

FIG. 12 shows a configuration example of the circuit 110.

The signal output from the photodetector 108 is amplified by an amplifier 137 and divided into three signals a, b, and c.

For the signal a, only a minimum frequency component of the self beat 8 of the optical comb is extracted by a band path filter 138 and transmitted to a frequency comparator 111 (output A). For the signal b, by a band path filter 139 that permits transmission of only those near the frequency fr-LD1, the beat 23 of the optical comb and the CW laser is extracted and put into a mixer 140. For the signal c, by a band path filter 141 that permits transmission of only those near the frequency Fs-LD2, only the beat 24 of the optical comb and the CW laser is extracted and put into the mixer 140. By the mixer 140, the beat signals 23 and 24 are multiplied together and the beat signals 25 and 26 of the beat signals 23 and 24 are generated. For the beat signals 25 and 26, by a band path filter 142, for example, only the beat 25 on a low-frequency side is extracted and transmitted to the phase frequency comparator 124 (output B).

Figure 13:
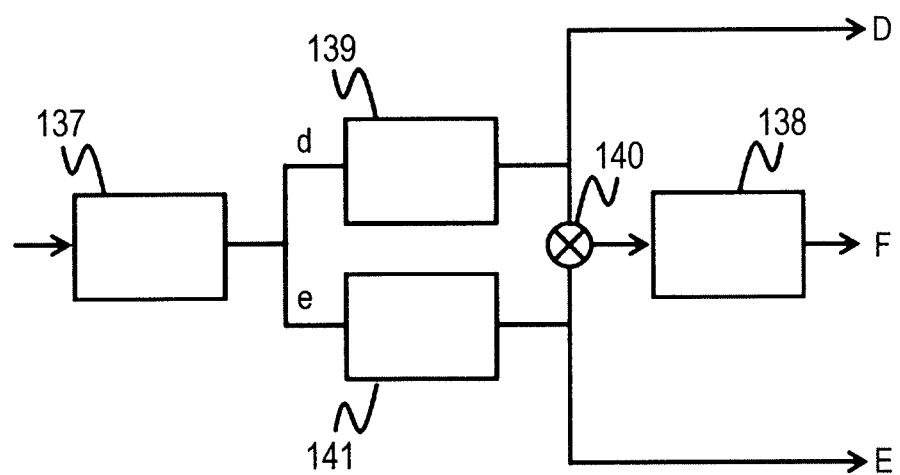
FIG. 13 is a diagram showing an example of a circuit configuration.

FIG. 13 shows a configuration example of the circuit 123.

Input from the photodetector 121 is amplified by the amplifier 137 and divided into two signals d and e. For the divided signal d, by a band path filter 139 which transmits only the frequency fr-LD1, only the beat 23 of the optical comb and the CW laser is extracted and divided into two. One of the signals obtained through the division is used for stabilizing the frequency of the CW laser (output D). The other signal is guided to the mixer 140. For the signal e, by the band path filter 141 that permits the transmission of only those near the frequency Fs-LD2, the beat 24 of the optical comb and the CW laser is extracted and divided into two. One of the signals obtained through the division is used for stabilizing the frequency of the CW laser (output E). The other signal is guided to the mixer 140. In the mixer 140, the signals of the frequencies fr-LD1 and Fs-LD2 extracted by the band path filters 139 and 141 are mixed together to generate the beat signals 25 and 26. For the beat signals 25 and 26, by the band path filter 138(142), for example, only the beat 25 on the low-frequency side is extracted and transmitted to the phase frequency comparator 124 (output F). Note that the band path filter 142 used for the beat signals 25 and 26 in the circuit 110 and the circuit 123 may be set in a manner such as to extract the beat 26 on a high-frequency side.

Figure 14:
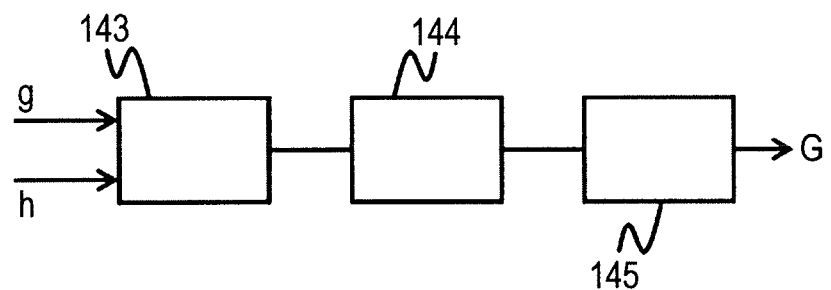
FIG. 14 is a diagram showing an example of a circuit configuration.

FIG. 14 shows a configuration example of the circuit 111.

A signal g of a constant frequency oscillated from the frequency reference 112 and input h from the output A of the circuit 110 are guided to a frequency comparator 143 to extract a frequency difference between the signal g and the signal h. Output from the frequency comparator is guided to a controller 144 and output of the controller 144 is guided to a controller 145 that controls the frequency of the optical comb. The controller 144 controls the controller 145 so that its input becomes a set value, and the controller 145 controls an oscillation frequency of the optical comb in accordance with the output of the controller 144. The control of the oscillation frequency of the optical comb can be realized, for example, in a case where the optical comb oscillator 101 is formed of an optical fiber, applying stress to the optical fiber to change an oscillator length or changing a refraction index through stress application or temperature change to change an optical path length. This circuit 111 can keep the oscillation frequency of the optical comb, that is, the mode interval 3 constant with respect to the frequency reference 112.

FIGS. 15 to 19 schematically show examples of the optical system 125.

Figure 15:
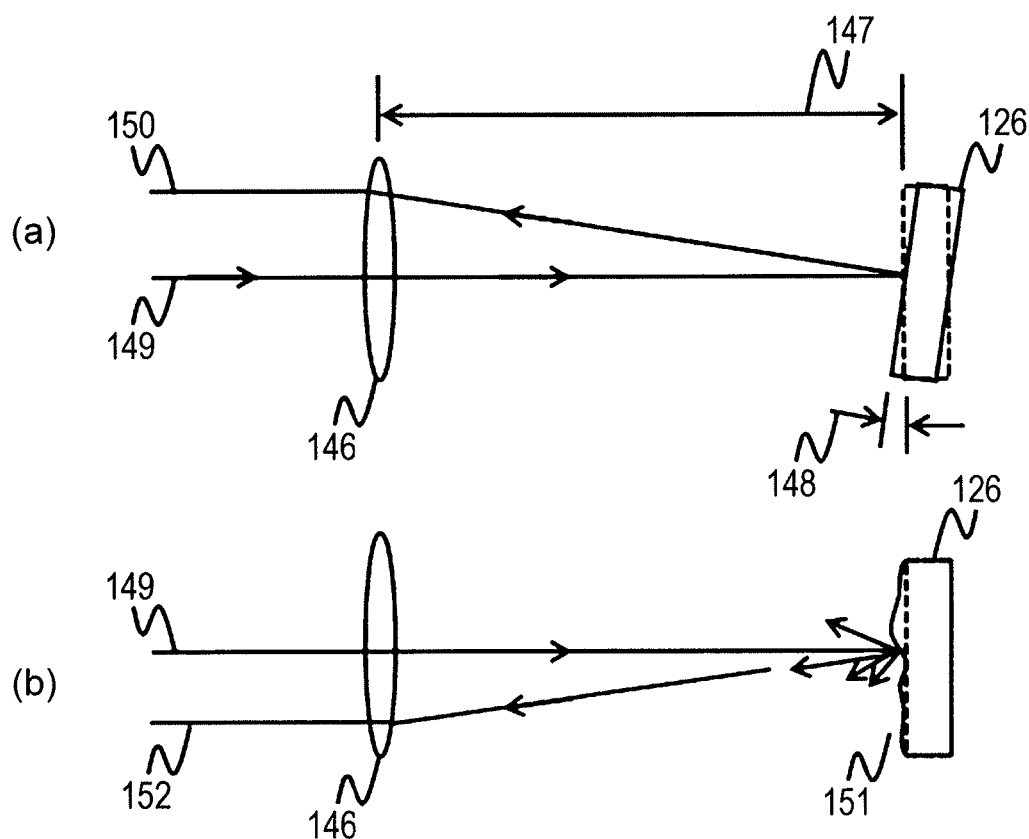
FIG. 15 is a diagram showing an example of a circuit configuration.

FIG. 15 shows a portion of the optical system 125 closest to an object to be measured 126. A lens 146 is a lens of the optical system 125 closest to the object to be measured 126, and the lens 146 is distant from the object to be measured 126 by a distance of 147 (X m). In a case where the lens 146 is inclined by an angle of 148 (Y rad) with respect to the optical system 125 as shown in (a), reflected light 150 of measuring light 149 from the object to be measured 126 is displaced on the lens 146 by 2×X×Ym. Thus, considering an assumed distance 147 to the object to be measured and inclination 148 of a mirror surface of the object to be measured, a gauge of the lens 146 is 2×X×Ym or above. In a case where a surface of the object to be measured is a scattering surface 151 as shown in (b), scattering light 152 returns to the lens 146. In a case where the scattering light 152 is isotropically scattered from irradiation position of the measuring light 149, an amount of light that can be adopted by the lens 146 is proportional to a square of the gauge of the lens 146, and thus the gauge can be increased to increase the amount of light to thereby increase a signal to noise ratio.

FIGS. 16 to 19 show examples of an optical system that two-dimensionally scans a measuring light.

Figure 16:
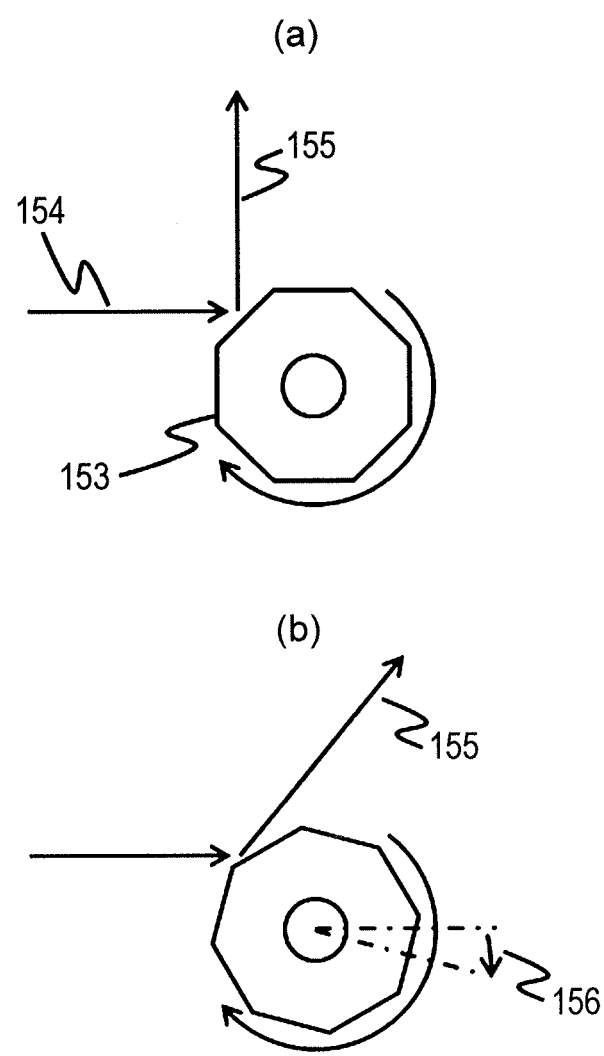
FIG. 16 is a diagram showing an example of configuration of an optical system that scans measuring light.

FIG. 16 shows an example where a polygon mirror 153 is used. For measuring light 154 entering to the scanning optical system as in (a), its propagation direction is changed by the polygon mirror 153, and measuring light 155 whose propagation direction has been changed is irradiated to the object to be measured. Moreover, as shown in (b), for the measuring light 155 irradiated to the object to be measured, its direction is changed following rotation 156 of the polygon mirror, and the measuring light 155 one-dimensionally scans on a surface of the object to be measured. Use of the polygon mirror with two orthogonal rotation axes makes it possible for the measuring light 155 to two-dimensionally scan on the surface of the object to be measured.

Figure 17:
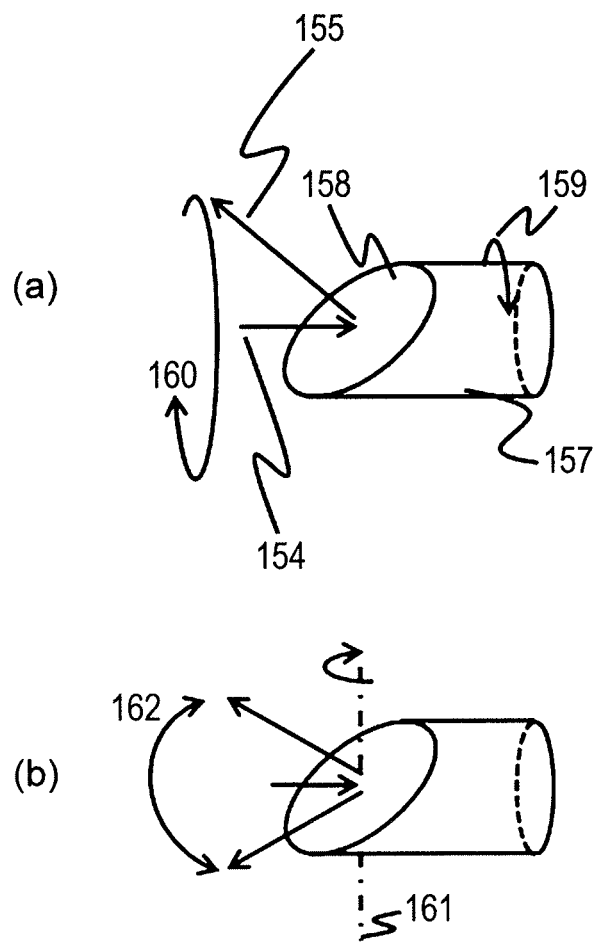
FIG. 17 is a diagram showing an example of configuration of an optical system that scans measuring light.

FIG. 17 shows the example of the optical system that two-dimensionally scans the measuring light 154 by use of an oblique mirror 158 provided on a cross section of a cylinder 157. As shown in (a), for the measuring light 154 entering to the scanning optical system, its direction is changed by the oblique mirror 158, and the measuring light 155 whose direction has been changed is irradiated to the object to be measured. A direction 160 of this measuring light 155 is rotated following rotation 159 of the cylinder 157, that is, the oblique mirror 158. Through the rotation 159 of the cylinder, the measuring light 155 can be scanned in a circular form. On the other hand, as shown in (b), upon passage through a point of the oblique mirror 158 where the measuring light is irradiated and rotation of the oblique mirror 158 at a rotation axis 161 at a right angle to a cylinder long axis, the measuring light 155 can be scanned in a direction different from the rotation 159. As described above, combining together the rotation 159 of the oblique mirror 158 around the cylinder axis and rotation around the rotation axis 161 makes it possible for the measuring light to be three-dimensionally scanned on the surface of the object to be measured.

FIG. 18 shows a schematic diagram of the optical system that scans the measuring light 154 by use of a parabolic mirror 163 and a polygon mirror 153. As shown in (a), the polygon mirror 153 having a rotation axis at a focal point of the parabolic mirror 163 is rotated to change position and an angle at which the measuring light 154 hits a surface of the parabolic mirror 163. In accordance with the position and the angle at which the measuring light 154 hits the surface of the parabolic mirror 163, the measuring light 155 irradiated from the parabolic mirror 163 to the object to be measured can be scanned one-dimensionally. Further, as shown in (b), rotating the parabolic mirror 163 and the polygon mirror 153 integrally in a direction orthogonal to a rotation axis of the polygon mirror 153 makes it possible for the measuring light 154 to two-dimensionally scan on the surface of the object to be measured. With this method, the measuring light 155 irradiated to the object to be measured can be parallel. With the combination of the parabolic mirror 163 and the polygon mirror 153, the polygon mirror 153 is set in the parabolic mirror 163, and therefore there exists a non-scanned region on the object to be measured. Thus, as shown in (c), using an object, such as a parabolic mirror 164, obtained by dividing the parabolic mirror 163 into halves can eliminate a range that cannot be scanned due to the polygon mirror 153.

FIG. 19 schematically shows an optical system that scans the measuring light 154 by use of a pair of mirrors 165 and 166. As shown in (a), the mirrors 165 and 166 have their mirror surfaces facing each other, and rotate around the rotation axes 167 and 168 respectively which are orthogonal with each other. The rotation of the mirror 166 around the rotation axis 167 makes it possible to one-dimensionally scan the measuring light 155 emitted from the scanning optical system. As shown in (b), the rotation of the mirror 165 around the rotation axis 168 can change position of the measuring light 155 hitting the mirror 166, thus making it possible to one-dimensionally scan the measuring light 155 irradiated from the scanning optical system. Combining together the rotation around the rotation axis 167 of the mirror 166 and the rotation around the rotation axis 168 of the mirror 165 makes it possible to two-dimensionally scan the measuring light 155 on the surface of the object to be measured. Note that instead of rotating the mirror 165 and the mirror 166, vibration around the rotation axes 167 and 168 may be performed to scan the measuring light 155.

Figure 20:
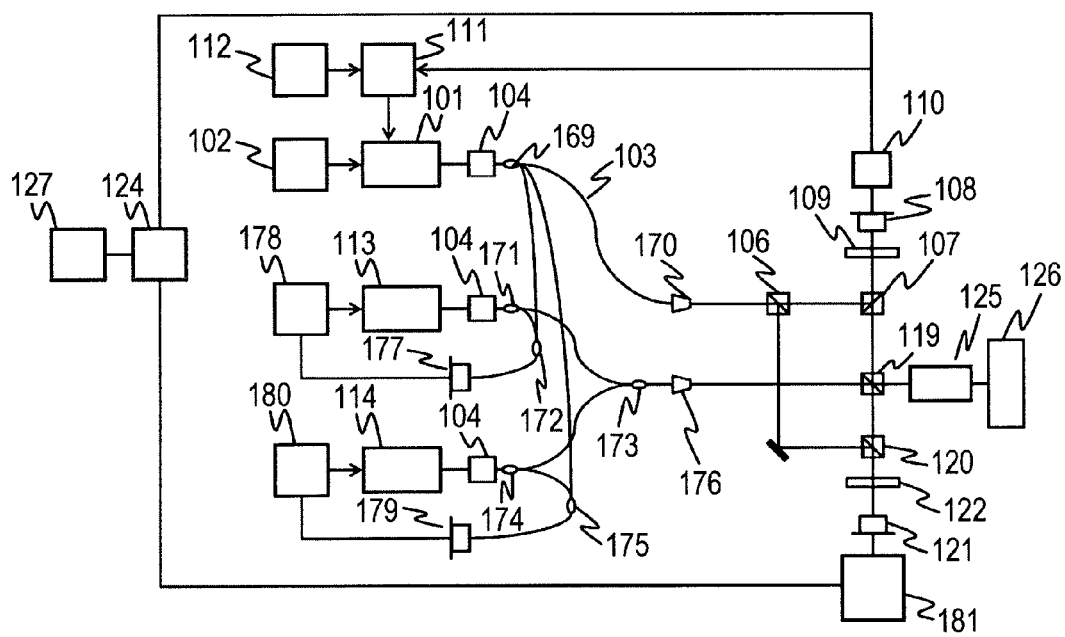
FIG. 20 is a pattern diagram showing configuration of a length and distance measuring device using a CW laser whose frequency is locked independently from the optical comb.

FIG. 20 shows another example of a device performing length measurement and distance measurement. The device shown in FIG. 20 is configuration for stabilizing the oscillation frequencies fLD1 and fLD2 of the first CW laser 113 and the second CW laser 114.

Light oscillated from the optical comb oscillator 101 is coupled to the optical fiber 103 and is propagated by passing through the isolator 104 for stabilizing the optical comb oscillator 101. With the configuration shown in FIG. 20, the optical comb is diverged into three by a fiber coupler 169. A light intensity ratio upon the division into the three is not necessarily trisectioned, it can be appropriately determined in view of measurement accuracy improvement, device configuration, etc., for example, weakening light propagated to the fiber couplers 172 and 175 with respect to light propagated to an output coupler 170 while strengthening light coupling the measuring light and the reference light.

Figure 21:
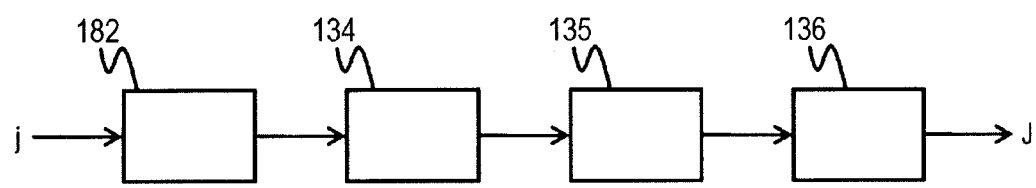
FIG. 21 is a diagram showing an example of circuit configuration.

One of the diverged optical combs is propagated to the output coupler 170. Those beyond the output coupler 170 are the same as those of FIG. 9, part of which will be omitted from the description. A part of the diverged three is coupled to light of the first CW laser 113 by a fiber coupler 172 and detected by a photodetector 177. The light detected by the photodetector 177 is a beat signal of the frequency difference fr-LD1 between the optical comb and the first CW laser 113, which corresponds to the beat 23 of FIG. 7. The beat signal detected by the photodetector 177 is guided to the circuit 178 and used for keeping constant relationship between the oscillation frequency of the first CW laser 113 and the frequency of the optical comb. FIG. 21 shows a detailed example of the circuit 178. From input j from the photodetector 177, only a frequency of fr-LD1 is extracted by a filter 182, the frequency is converted into a proportional voltage by an FV converter 134, and a voltage applied to a CW laser driver 136 is controlled by a P1 controller 135 so that a voltage of output of the FV converter 134 becomes constant. With such configuration, the frequency fr-LD1 can be kept constant, and the frequency difference 22 between the first CW laser 113 and the optical comb can be kept constant.

Figure 22:
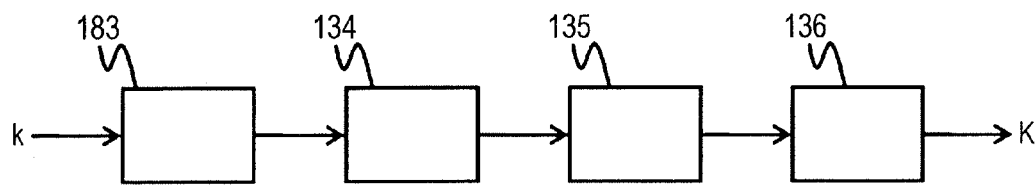
FIG. 22 is a diagram showing an example of circuit configuration.

The light divided into three by the fiber coupler 169 and guided to a fiber coupler 175 is coupled to light emitted from the second CW laser 114 by the fiber coupler 175. The coupled light is detected by a photodetector 179. A signal detected by the photodetector 179 is a beat signal of the frequency difference fr-LD2 between the optical comb and the CW laser 114 which corresponds to the beat 24 of FIG. 7. The beat signal detected by the photodetector 179 is guided to a circuit 180, and is used for stabilizing the oscillation frequency of the second CW laser 114. FIG. 22 shows a detailed example of the circuit 180. From input k from the photodetector 179, only the frequency external force Fs-LD2 is extracted by a filter 183, the extracted frequency is converted into a proportional voltage by the FV converter 134, and a voltage applied to the CW laser driver 136 is controlled by the PI controller 135 so that output voltage of the FV converter 134 constant. With such configuration, the frequency external force Fs-LD2 can be kept constant, and the frequency difference 23 between the second CW laser 114 and the optical comb can be kept constant.

The filter 182 can be a low path filter which permits transmission of the frequency fr-LD1 and does not permit transmission of frequencies equal to or larger than fr+1-LD1. Moreover, in a case where a signal of a frequency lower than fr-LD1 is to be cut off, a band path filter may be used, or a low path filter and a high path filter may be combined together for use. Used as the filter 183 can be a low path filter which permits transmission of the frequency external force fs-LD2 and which does not permit transmission of frequencies equal to or larger than fs+S-LD2. Moreover, in a case where signal of a frequency lower than external force fs-LD2 is to be removed, a band path filter may be used, or a low path filter and a high path filter may be combined together.

Keeping the relationship between the frequencies of the first CW laser 113 and the second CW laser 114 constant through the configuration as shown in FIG. 20 provides advantages: (a) there is no need of preparing such a filter with excellent attenuation characteristics that separately extracts the beat signals of the frequency fr-LD1 and the frequency approaching the external force fs-LD2; and (b) an unstable element in a process of stabilizing the frequencies of the CW lasers 113 and 114 with respect to the optical comb can be eliminated.

Here, the above (b) will be described briefly.

To stabilize the first CW laser 113 or the second CW laser 114 corresponding to the optical comb, a frequency difference between the frequency of the CW laser and a mode of the optical comb having a closest frequency to that of the CW laser is used. Finally, the oscillation frequency of each of the CW lasers 113 and 114 is increased to a high frequency corresponding to required measurement accuracy, but immediately after activation of the CW lasers, the oscillation frequencies of the respective CW lasers 113 and 114 may be very close to each other. In this case, a beat signal with the optical comb also appears at very close two frequencies. In this case, configuring the circuit used for stabilizing the CW lasers as in FIG. 13 results in transmission of only one of the filter 139 and the filter 141, and thus, for example, upon the transmission through the filter 139, the output F may not be obtained. Thus, there is no input to the driver of one of the CW lasers, and the oscillation frequency is not controlled. Moreover, also in the CW laser controlling the oscillation frequency by use of the output D, two frequency signals are inputted to the FV converter and PI control is performed based on this, thus resulting in unsteadiness. However, with the configuration shown in FIG. 20, the CW lasers are coupled to the optical comb separately from each other to generate beat signals and the beat signals are detected by the different photodetectors, thus causing no problem described above. In the signals extracted by filtering the beat signals, there are the beats of the CW laser themselves and the optical comb, thus causing no problem that the frequency control becomes unstable.

Figure 23:
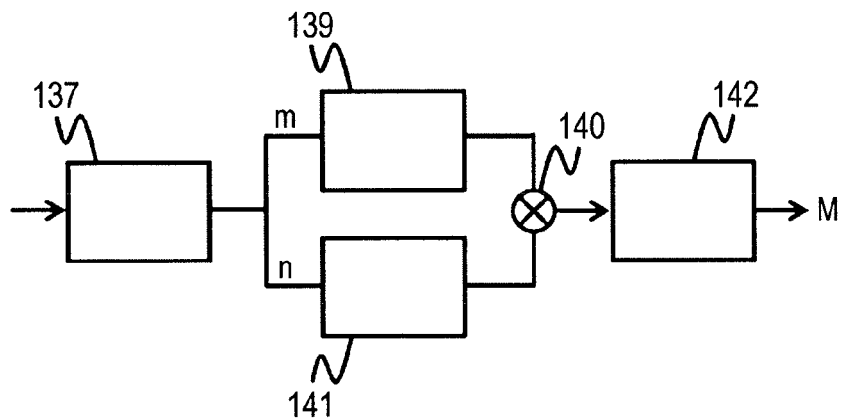
FIG. 23 is a diagram showing an example of circuit configuration.

FIG. 23 shows a detailed configuration example of a circuit 181 of the configuration diagram shown in FIG. 20.

Input from the photodetector 121 is amplified by the amplifier 137 and divided into two (m and n). From the signal m obtained through the division, only the beat 23 between the optical comb and the CW laser is extracted by the band path filter 139 that permits transmission of only the frequency fr-LD1, and also from the signal n, only the beat 24 between the optical comb and the CW laser is extracted by the band path filter 141 that permits transmission of only those near the frequency Fs-LD2 and guided to the mixer 140. In the mixer 140, the signal having a frequency fr-LD1 and the signal having a frequency fs-LD2 are mixed together to generate the beat signals 25 and 26. Of the beat signals 25 and 26, for example, only the beat 25 on the low-frequency side and transmitted to the phase frequency comparator 124 (output M). The band path filter 142 used of the beat signals 25 and 26 by the circuit 110 and the circuit 123 may be set in a manner such as to extract the beat 26 on a high-frequency side.

Next, regarding a problem (B) associated with application of length measurement and distance measurement using the optical comb to electric and mechanical industries, its cause is first described and then countermeasure against it will be described.

Performing the length measurement and the distance measurement by use of the optical comb is achieved by observing the self beat. Approximately $10^4=10000$ of self beats are generated as a result of detecting the optical comb by the photodetector, although they depend on the bandwidth of the photodetector. However, the beat signal used for the actual distance measurement is only one beat among these beats. Thus, it is difficult to extract only the target beat from the signals spread in the entire bandwidth detected by the photodetector. Further, intensity of the target beat signal is as weak as approximately $10^3$-$10^4$ (1000-10000), and in a case where the measurement is performed by weakening the light so as not to cause saturation of the photodetector, the required beat signal becomes very weak. Thus, a signal to noise ratio decreases, and the measurement accuracy deteriorates. To address this problem, some countermeasures, for example, before light detection by the photodetector, selectively extracting only periphery of the required beat signals by use of the optical band path filter and increasing a ratio of the required signals occupying the detected light signal, are taken. But, they are not fundamental solutions to the problem.

Thus, in the invention, suggested is a method of using only light required for the length measurement without presence of background.

Figure 24:
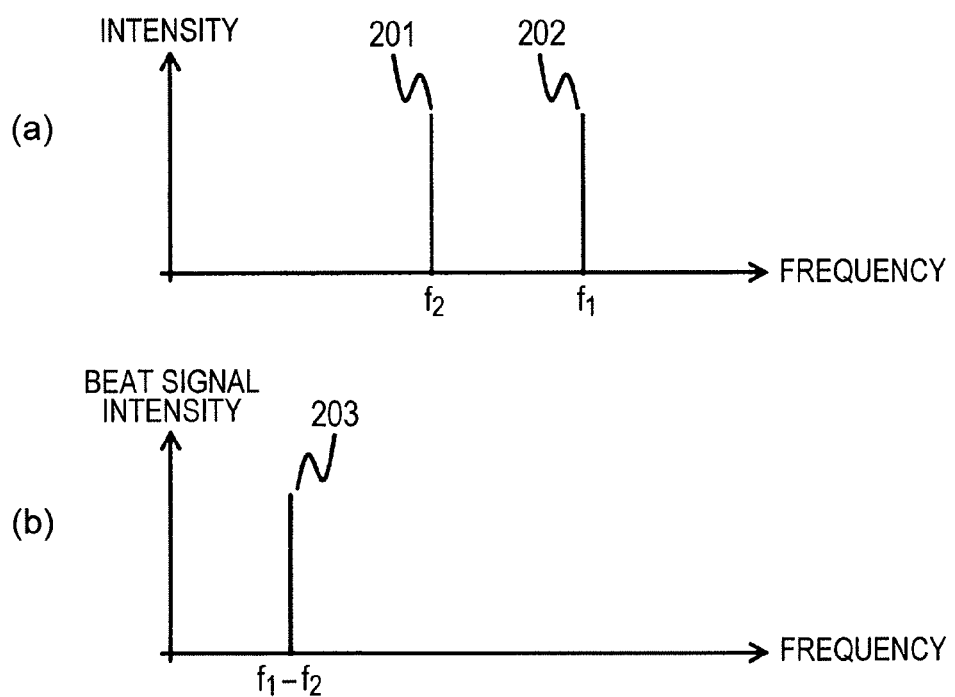
FIG. 24 is a diagram showing an example of configuration of a length and distance meter having as a light source a plurality of lasers whose frequency is controlled.

Used as the light source are a plurality of CW lasers oscillating a signal frequency whose oscillation frequency is controlled, or a single CW laser oscillating a plurality of modes, or a CW laser oscillating with a single frequency and divided into two, one or both of which is subjected to frequency modulation. Then as shown in FIG. 24 (a), referring to as an example a case where a CW laser (201) oscillating with a frequency f1 and a CW laser (202) oscillating with a frequency f2 are used as the light source, principles and a configuration example will be described.

The CW laser irradiated from the light source is divided into two, one of which is defined as reference light and the other one of which is defined as measuring light. The reference light is detected by the photodetector after the division, and a beat signal corresponding to a difference frequency as shown in FIG. 24 (b) is obtained (203). The measuring light is adopted and detected by the photodetector, and a beat signal corresponding to a difference frequency is obtained. For the beat signal of the measuring light, compared to the beat signal of the reference light, its phase is delayed by a proportion corresponding to a distance in which it is propagated to the object to be measured and returns therefrom. From this phase delay and the frequency of the beat, the distance to the object to be measured is obtained. Distance measurement accuracy is determined by the frequency of the beat signal, that is, a frequency difference of light irradiated from the light source and stability of the frequency difference, and phase measurement accuracy, and in a case where the phase is determined with an accuracy of π/50 by use of, for example, light with a frequency difference of 50 GHz, the distance measurement accuracy is approximately 30 μm.

In this detection principle, the measuring light detected by the photodetector has only two modes. Thus, in a case where light intensity of the frequency f1 is a1 and light intensity of the frequency f2 is a2, a detected signal is expressed by Formula 1.

$$|a1^*\exp(i2\pi f1 t)+a2^*\exp(i2\pi f2 t)|^2=a1^2+a2^2+a1^*a2^*\exp(i2\pi(f1-f2)t)+a1^*a2^*\exp(-i2\pi(f1-f2)t) \quad \text{(Formula 1)}$$

From this, it can be understood that the ratio of the beat signal with respect to the total signal is $2^*a1^*a2/(a1^2+a2^2+2^*a1^*a2)$, and where $a1=a2$, 50% of all are beat signals that can be used for the measurement. Since a case where the optical comb is used as a reference frequency, the ratio of the beat signal with respect to the total signal is several percents, and it is possible to increase signal intensity to approximately 10 times in this detection method.

Figure 25:
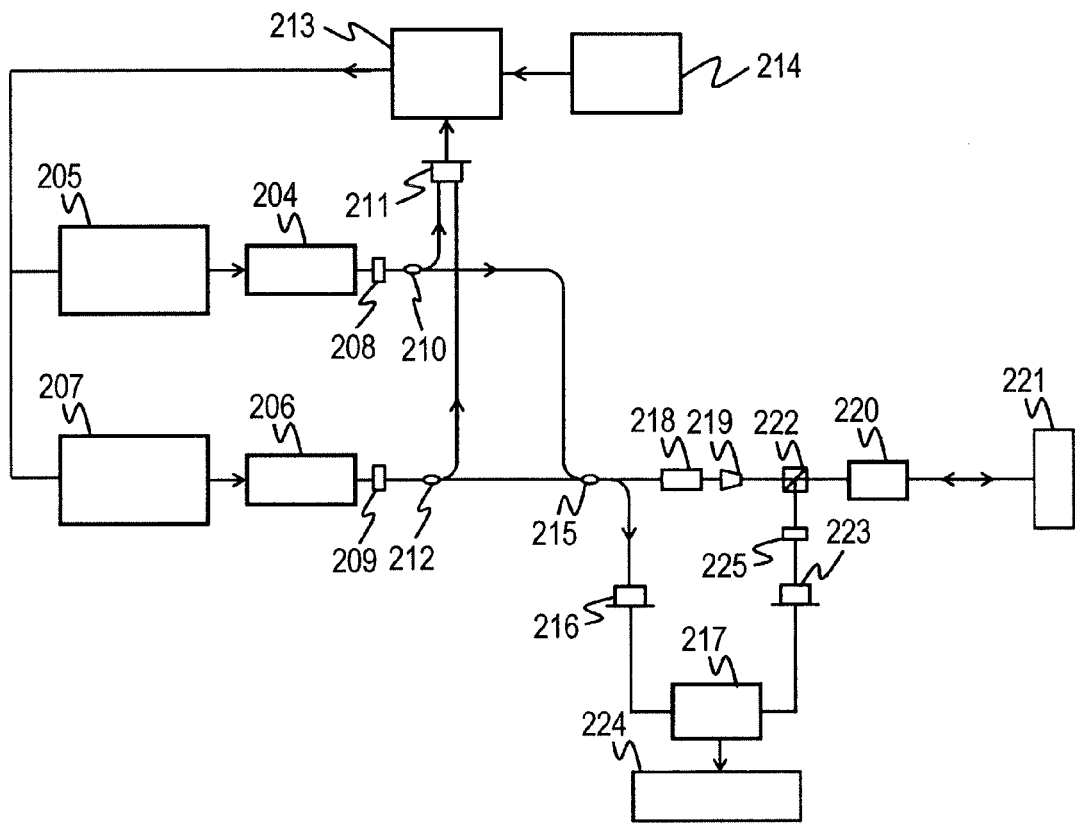
FIG. 25 is a pattern diagram showing an example of configuration of a length and distance meter having as a light source a plurality of lasers whose frequency is controlled.

FIG. 25 shows a detailed configuration example of a distance measurement system that permits measurement based on this measurement principle.

For a CW laser 204 oscillating with the frequency f1, driving and oscillation frequency are controlled at a circuit 205, and for a CW laser 206 oscillating with the frequency f2, driving and oscillation frequency are controlled at a circuit 207. CW lasers each of which oscillation frequency is controllable and which oscillate in a narrow band are used as the CW laser 204 and 206, and for example, it is possible to use feedback-type CW lasers. An isolator 208 is used for the CW laser 204 and an isolator 209 is used for the spectrum 206 so as not to cause returning the reflected light and the scattering light from outside to the oscillator, thereby stabilizing the CW laser oscillation. Light emitted from the CW laser 204 is divided into two by a fiber coupler 210, and one of them reaches a photodetector 211. Light emitted from the CW laser 206 is divided into two by a fiber coupler 212 and one of them reaches a photodetector 211. The photodetector 211 detects the light from the CW laser 204 and the CW laser 206 and outputs a beat signal corresponding to a frequency difference f1−f2 therebetween (203 of FIG. 24). The beat signal outputted from the photodetector 211 is guided to a circuit 213 and compared with a frequency of a frequency source 214. For the frequency source 214, as shown in FIG. 10, an atomic clock or a high-precision oscillator, or an electric wave signal of a constant frequency used in a GPS (global positioning system) can be used. In the circuit 213, the beat signal and the reference frequency are compared with each other, and a current or a voltage proportional to a frequency difference therebetween is outputted. A signal proportional to the frequency difference is inputted to the circuit 205 and a circuit 207, and they are used for controlling the oscillation frequencies of the spectrum 204 and the spectrum 206 and controlling to keep the frequency difference constant. As described above, by using the outside reference frequency, it makes possible to keep a oscillation frequency difference between the plurality of CW lasers constant.

Next, the measurement system will be described.

Part of the light emitted from the CW laser 204 and divided by the fiber coupler 210 reaches a fiber coupler 215 and is mixed with part of the light emitted from the CW laser 206 and divided by the fiber coupler 212. The light propagated while mixed is divided into reference light and measuring light by the fiber coupler 215. Here, a ratio of light division by the fiber coupler 215 is not necessarily 1 to 1, and appropriate selection may be made so as to weaken the reference light and strengthen the measuring light. The reference light is received by a photodetector 216, is converted into a beat signal corresponding to the frequency difference, and is transmitted to a circuit 217. The measuring light is divided by the fiber coupler 215, then passes through an isolator 218, is emitted into the air from the fiber by an output coupler 219, and is irradiated to an object to be measured 221 through an optical system 220. Light reflected or scattered at the object to be measured is received by the optical system 220, diverges a light path by a beam splitter 222, and is detected by a photodetector 223. The photodetector 223 converts the measuring light into a beat signal corresponding to the frequency difference and transmits it to the circuit 217. In the circuit 217, phases of the beat signal of the reference light as input and the beat signal of the measuring light are measured, a delay of the phase of the beat signal of the measuring light with respect to the phase of the beat signal of the reference light is measured, distance to the object to be measured is calculated based on the phase delay and the frequencies of the beat signals, and the calculated distance is displayed in a display unit 224.

To the photodetector 223, in addition to the measuring light, background light from the measurement environment enters. Thus, signals attributable to the background light are obtained in a wide range, and the beat signal of the required measuring light is buried. Alternatively, there is a risk of deterioration. Thus, a filter 225 that permits transmission of only frequencies very close to the measuring light can be used immediately before the photodetector 223 to prevent the required beat signal from being buried in the background.

Figure 26:
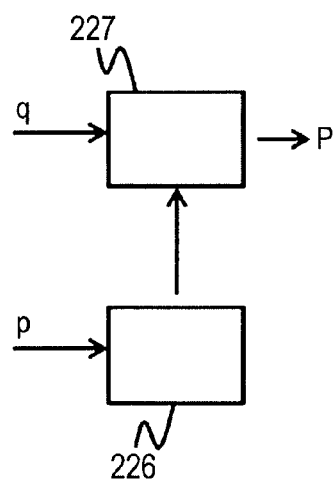
FIG. 26 is a diagram showing an example of circuit configuration.

The circuit 213 is formed by using, for example, a frequency divider 226 and a phase frequency comparator 227 as shown in FIG. 26. Input p from the photodetector 211 is frequency-divided to a frequency substantially equal to the reference frequency by the frequency divider 226. Output of the frequency divider 226 becomes input of the frequency comparator 227 and is used for obtaining a frequency difference P from the reference frequency q. Used here as the frequency comparator 227 can be, for example, a lock-in amplifier or a phase lock loop circuit (PLL circuit).

Figure 27:
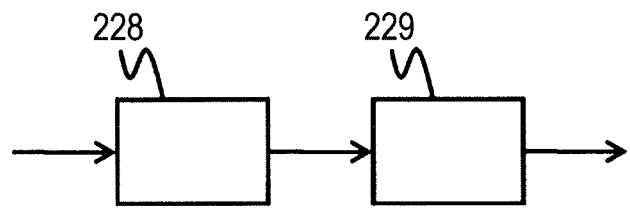
FIG. 27 is a diagram showing an example of circuit configuration.

The circuits 205 and 207 are formed by using, for example, a PI controller 228 and a CW laser driving circuit 229, as shown in FIG. 27. The PI controller 228 controls the CW laser driving circuit 229 so as to provide a predetermined frequency difference between the beat signal of the CW laser outputted from the circuit 213 and the reference frequency. Here, for the control of the CW laser 204 and the CW laser 206, the frequencies of the both CW lasers may be controlled to keep an oscillation difference therebetween constant, or one of the CW lasers may be oscillated without being controlled and the oscillation frequency of the other one of them may be controlled to thereby keep the oscillation frequency difference between the CW lasers constant. When controlling both of the CW lasers, operations of their PI controllers 228 can be reversed with each other to control the CW laser driving circuits to thereby increase a frequency control range.

Figure 28:
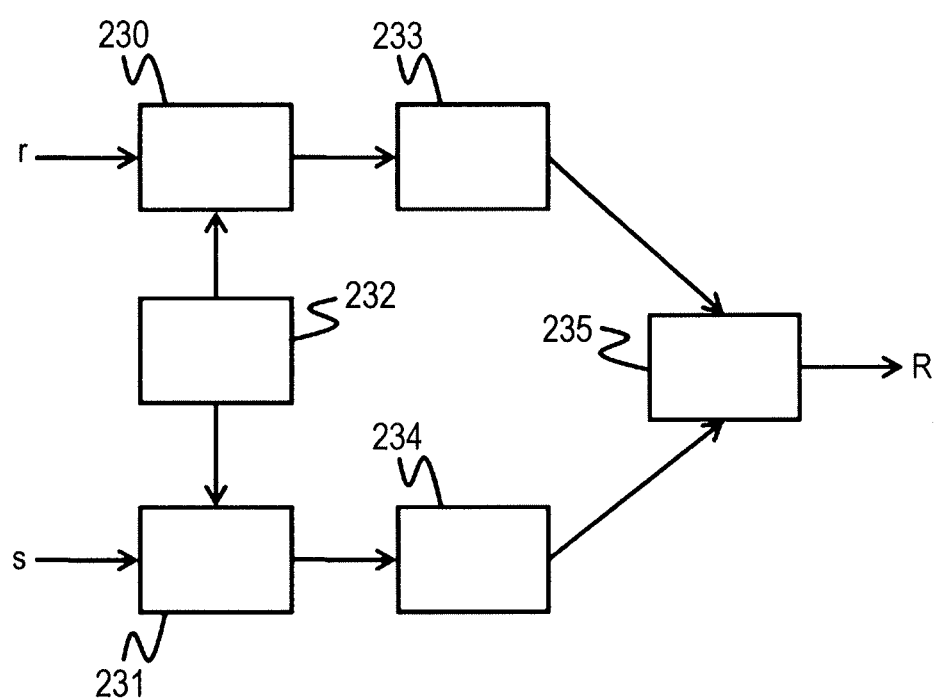
FIG. 28 is a diagram showing an example of circuit configuration.

FIG. 28 shows a configuration example of the circuit 217. The reference light measured by the photodetector 216 is converted into a beat signal and inputted to the circuit 217 (r of FIG. 28), and the measuring light measured by the photodetector 223 is converted into a beat signal and inputted to the circuit 217 (s of FIG. 28). Input r is mixed with the reference signal of a constant frequency oscillated by a frequency source 232 in a mixer 230, and the input s is mixed with the reference signal of the constant frequency oscillated by the frequency source 232 in a mixer 231. Here, the reference signal is not the same with the frequency of the beat and is different therefrom by approximately kHz or MHz. For the signals r and s mixed with the reference signal, only the beat signals corresponding to its difference frequency are extracted by the respective filters 233 and 234, and are inputted to a phase frequency comparator 235. In the phase frequency comparator, phases of the beat signal generated from the measuring light and the reference signal and the beat signal generated from the reference light and the reference signal are compared to each other, and based on a difference between the phases, the distance to the object to be measured is calculated. In this manner, filtering and phase comparison can be relatively easily performed even on beats of a high frequency on which it is difficult to directly perform them. In a case where the used filter and the used bandwidth for the phase comparison can directly process the beat frequency, without mixing with the reference signal or performing filtering, it can be inputted directly to the phase frequency comparator to measure the phase difference.

In the configuration example shown in FIG. 25, the two CW lasers are sued to perform the length measurement. In this configuration, the beat signal used for the length measurement has a single frequency, and a measurement range remains almost a wavelength corresponding to the beat frequency. Enlarging the measurement range and realizing highly accurate length measurement in a wide range requires combination with another length measurement and distance measuring method or use of a beat of a lower frequency. Presented here is an example of length and distance measurement which controls three CW lasers oscillating with different frequencies and which uses a beat signal between these CW lasers.

Figure 29:
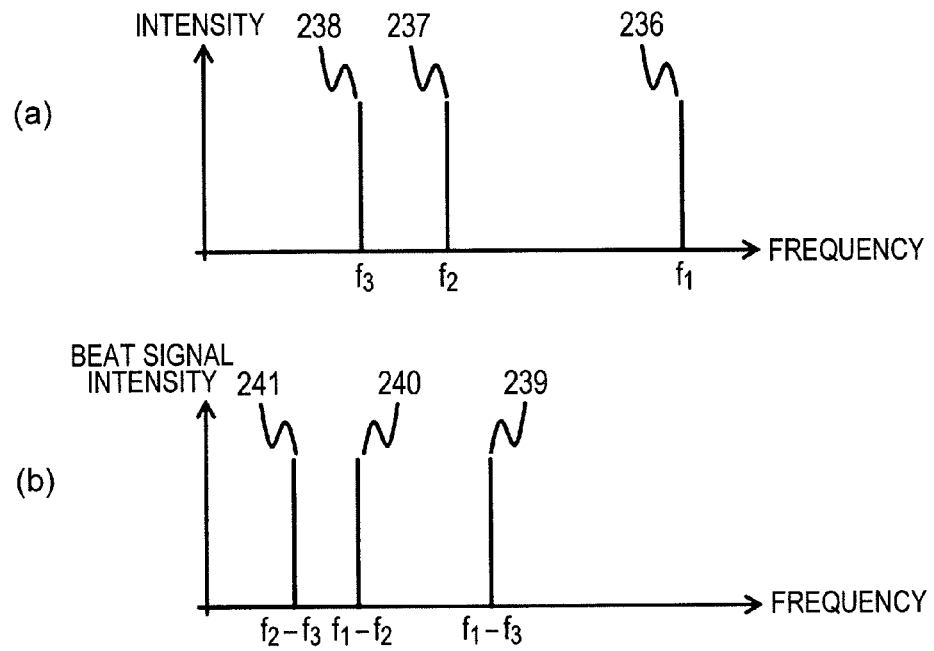
FIG. 29 is a diagram schematically showing relationship between CW lasers with three different frequencies and frequencies of beat signals generated by them.

Principles will be described, referring to FIG. 29. In FIG. 29, frequencies of the CW lasers are f1, f2, and f3 where f1>f2>f3, and phases are measured with an accuracy of 1/100. In a case where the CW lasers of the three frequencies f1, f2, and f3 are detected by a photodetector, obtained signals are three kinds of beat frequencies, f1−f2, f2−f3, and f1−f3. Here, when selecting the frequencies f1, f2, and f3 so as to satisfy a relationship therebetween that f1−f3=100+(f2−f3), measurement accuracy is determined by the beat of the highest frequency f1−f3 and measurement range is obtained one hundred times of the frequency f1−f3 by the beat of the frequency f2−f3 that is one hundredth of the frequency f1−f3. Similarly, increasing the number of frequencies of the CW lasers to four and controlling its oscillation frequency interval makes it possible to enlarge the measurement range while maintaining the length measurement accuracy or improve the length measurement accuracy while maintaining the measurement range. Specifically, for example, using four CW lasers oscillating with four frequencies f1, f2, f3, and f4 where f1>f2>f3>f4 and controlling the frequencies so as to provide f1−f4=100 GHz, (f2−f4)=(F1−f4)/100=1 GHz, (f3−f4)=(f1−f4)/10000=10 MHz results in a measurement range of 15 m with an accuracy of 15 μm. With this method, the measurement accuracy is determined by a frequency upper limit of the photodetector or the circuit and the measurement range is determined by an oscillation line width of the CW laser used for the measurement. That is because, the beat frequency of a minimum frequency determining the measurement range is determined by the closest mode interval, while the mode interval cannot approach the oscillation line width or lower. In reality, using a CW laser having an oscillation line width of approximately 100 kHz makes it possible to use a beat signal of approximately 200 kHz. A measurement range in this case is approximately 750 m. Providing a measurement range of 750 m while maintaining an accuracy of 15 μm requires at least five CW lasers where a phase of a beat signal is determined with an accuracy of 1/100. Moreover, for the purpose of generating a beat of an even higher for example, required for improving the measurement accuracy, it is possible to add one or more CW lasers.

Figure 30:
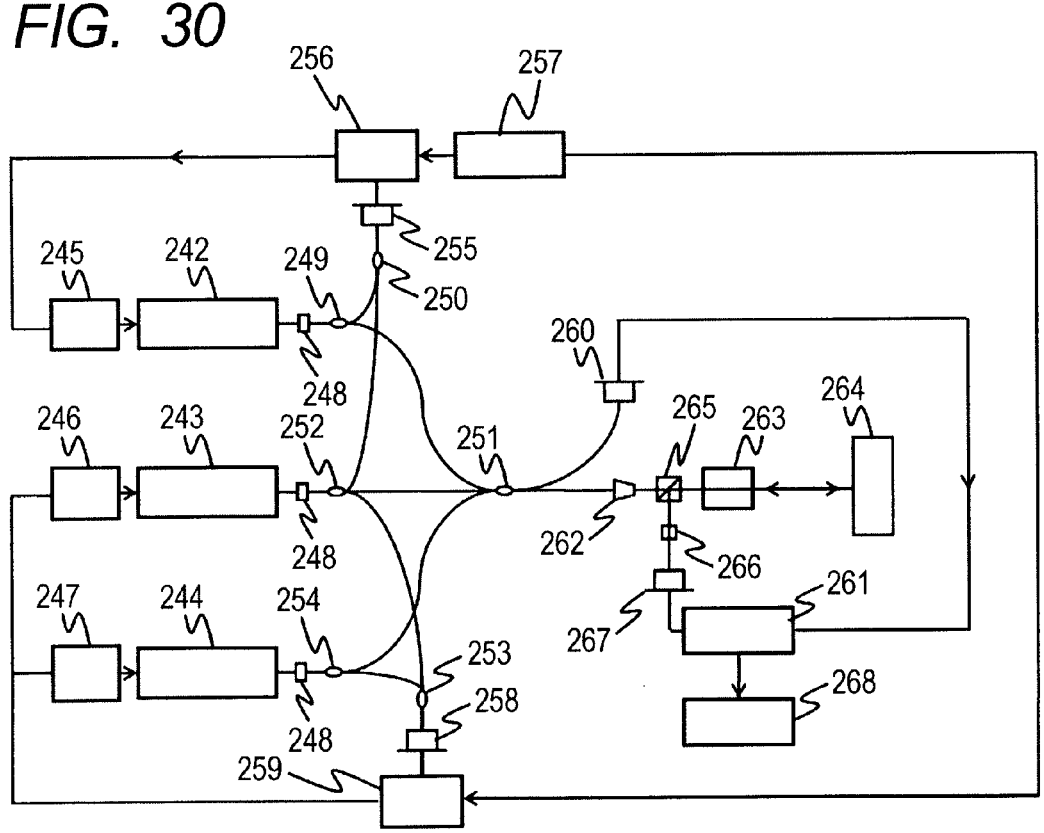
FIG. 30 is a diagram schematically showing configuration of a device that measures length and distance by the CW lasers whose three frequencies are controlled.

Referring to FIG. 30, a configuration example of a case where length measurement using three CW lasers is performed will be described.

CW lasers 242, 243, and 244 oscillating with a single frequency are driven by driving circuits 245, 246, and 247, respectively. Light oscillated from the CW laser 242 passes through an isolator 248 for stabilizing the CW laser 242, is guided to a fiber coupler 249, and is divided into two. One of the divided lights is used as a reference for controlling the oscillation frequency and thus guided to a fiber coupler 250, and the other one of the light is used as measuring light and thus is guided to the fiber coupler 251. A ratio of the light division by the fiber coupler 249 is not necessarily 1:1, the intensity can be appropriately determined as needed, for example, the light guided to the fiber coupler 250 is weakened and the light guided to the fiber coupler 251 is strengthened. Light oscillated from the CW laser 243 passes through the isolator 248 for stabilizing the CW laser, is guided to a fiber coupler 252, and is divided into three. Part of the divided light is used as a reference for controlling a frequency difference from the CW laser 242 and thus is guided to the fiber coupler 250. The light guided to a fiber coupler 253 is used as a reference for controlling a frequency difference from the CW laser 244. The light guided to the fiber coupler 251 is used as measuring light. Here, a ratio of the light division by the fiber coupler 252 is not necessarily 1:1:1, and the intensity ratio can be appropriately determined as needed, for example, the light used for the measurement is strengthened. The light oscillated from the CW laser 244 passes through the isolator 248 for stabilizing the CW laser, is guided to a fiber coupler 254, and is divided into two. One of the divided lights is used as a reference for controlling the oscillation frequency and thus guided to the fiber coupler 251. A ratio of the light division by the fiber coupler 254 is not necessarily 1:1, and the intensity can be appropriately determined as needed, for example, the light guided to the fiber coupler 253 is weakened and the light guided to the fiber coupler 251 is strengthened.

The light of the CW laser 242 and the CW laser 243 mixed together by the fiber coupler 250 is detected by a photodetector 255 and converted into a beat signal. The beat signal as output of the photodetector 255 is guided to a circuit 256 and its frequency is compared with a reference frequency as a constant frequency oscillated by a frequency source 257. Output from the circuit 256 is guided to the driving circuit 245, and based on the output from the circuit 256, the oscillation frequency of the CW laser 242 is controlled so as to provide a constant frequency difference from the oscillation frequency of the CW laser 243. The light of the CW laser 243 and the CW laser 244 mixed together by the fiber coupler 253 is detected by a photodetector 258 and converted into a beat signal. The beat signal as output of the photodetector 258 is guided to a circuit 259 and its frequency is compared with a reference frequency as a constant frequency oscillated by the frequency source 257. The output from the circuit 259 is guided to the driving circuits 246 and 247, and based on output of the circuit 256, oscillation frequencies of the CW laser 243 and the CW laser 244 are controlled so as to keep the oscillation frequencies of the CW laser 243 and the CW laser 244 constant. Used here as the frequency source 257 can be, for example, as shown in FIG. 10, an atomic clock or a GPS signal, or output of a stabilizing oscillator.

The lights of the CW lasers 242, 243, and 244 guided to the fiber coupler 251 are divided into two. One of the divided lights is guided to a photodetector 260 to be provided as phase reference light and is converted into a beat signal corresponding to a frequency difference of the CW lasers 242, 243, and 244, and is guided to a circuit 261. The other light obtained by the division by the fiber coupler 251 is used as measuring light. The measuring light is emitted from a fiber in an output coupler 262, passes through an optical system 263, and is irradiated to an object to be measured 264. The measuring light reflected or scattered at the object to be measured is condensed by the optical system 263, its optical path is divided by a beam splitter 265, and the measuring light passes through a filter 266 and is detected by a photodetector 267. The measuring light converted into a beat signal by the photodetector 267 is guided to the circuit 261, where its phase is compared with the beat signal of the reference light. The optical system 263 here may be formed of an optical system scanning the measuring light and an optical system for light flooding as illustrated in FIGS. 15 to 19, and its configuration will be omitted from description. The filter 266 arranged immediately in front of the photodetector 267 is used for removing background light mixed with the measuring light collected by the optical system 263 is sued, and is, for example, such a band path filter that permits transmission of only the frequencies of the CW lasers 242, 243, and 244.

Figure 31:
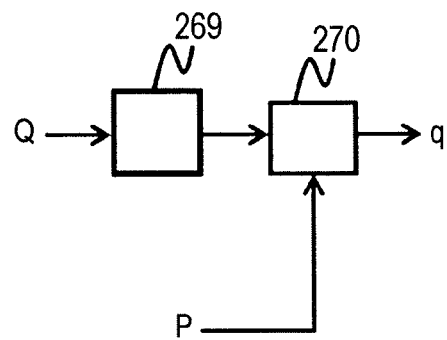
FIG. 31 is a diagram showing an example of circuit configuration.

FIG. 31 shows a detailed configuration example of the circuits 256 and 259.

Beat signals by the CW lasers as output of the photodetectors 255 and 258 are inputted from Q of FIG. 31 to the circuit 246 or 259, and its frequency is lowered by a frequency divider 269 to, for example, one (integer number)-th. Then the frequency is compared with a signal of a constant frequency from the frequency source 257 by a frequency comparator 270, and output a voltage or a current determined by a difference between these frequencies from the frequency source 257 (q of FIG. 31). The configuration as shown in FIG. 31 is useful for a case where the beat frequency of the light is a relatively high frequency or a case where a difference between the oscillation frequency of the oscillator or the like used as the frequency source and the beat frequency of the light is large. On the other hand, in a case where the frequency used as the frequency source is similar to the beat signal or a case where the beat signal is included in a band of the phase frequency comparator, the frequency divider 269 is not necessarily used, and direct phase comparison between the beat signal and the signal of the frequency source 257 may be made.

Figure 32:
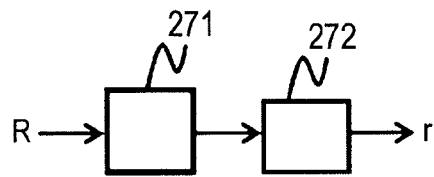
FIG. 32 is a diagram showing an example of circuit configuration.

FIG. 32 shows a detailed configuration example of the circuits 245, 246, and 247.

A voltage or a current determined by a frequency difference between the beat signal as the output of the frequency comparator 270 and the frequency source 257 is inputted from R to the circuit 245, 246, or 247. The input R controls a CW laser driving circuit 272 so that the oscillation frequency of the CW laser becomes a set frequency. In this manner, the oscillation frequency of the CW laser can be stabilized by the photodetector which detects the CW laser and the beat, a circuit making phase comparison with the reference frequency, and the control of the CW laser driving circuit by the PI controller. Note that the CW laser driving circuit 272 may be a PID controller.

In the configuration shown in FIG. 30, the CW lasers 242, 243, and 244 are driven and controlled by the circuits 245, 246, and 247. But it is also possible to configure that without controlling the CW laser 243, and oscillating the CW laser 243 freely and controlling the OW lasers 242 and 244 so as to provide a constant frequency with respect a frequency of the CW laser 243. Note that the circuit 246 is not required in this case.

Figure 33:
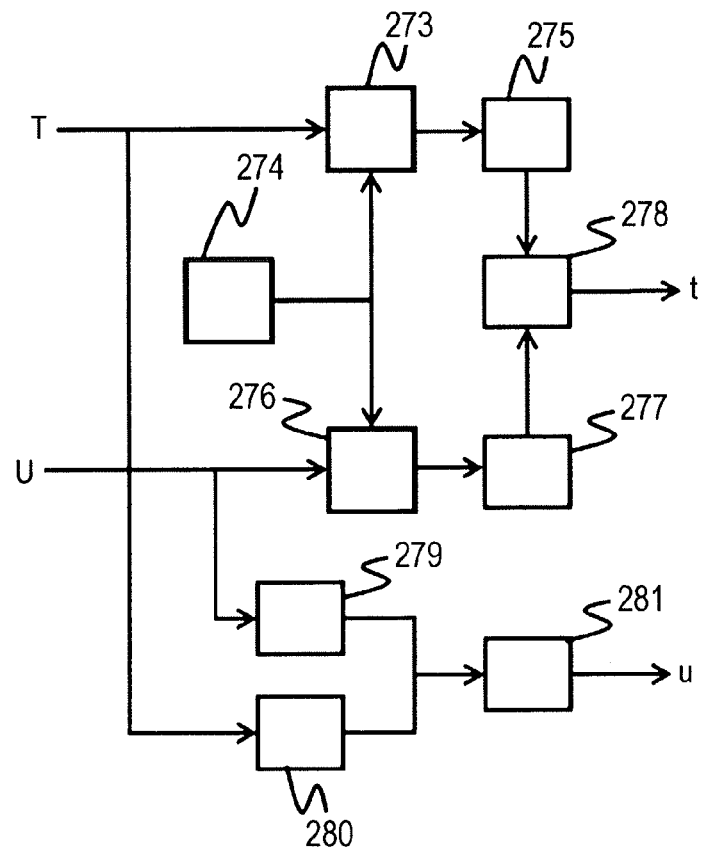
FIG. 33 is a diagram showing an example of circuit configuration.

FIG. 33 shows a detailed configuration example of the circuit 261 that inputs a beat signal from the photodetector 260 and the photodetector 267.

The reference light converted into the beat signal by the photodetector 260 is inputted from T to the circuit 261. The beat signal of the reference light is divided and part of the signal is guided to a mixer 273 and mixed with the signal from a frequency source 274. Here, selected as the frequency of the frequency source 274 is a frequency which does not agree with the highest frequency of the beat signals of the reference light but is very close to it. The mixed signals of the beat signal of the reference light and the signal of the frequency source 274 is guided to a filter 275, and only a frequency of a beat signal corresponding to a frequency difference between the beat signal of the reference light and the signal of the frequency source 274 is extracted. As described above, in a case where a signal to be extracted has a high frequency, a beat can be generated by mixing with a signal of a frequency not agreeing with a target frequency but very close thereto and extracted as a low-frequency signal. Similarly, the measuring light converted into the beat signal by the photodetector 267 is inputted from U to the circuit 261 and divided, and part of the light is guided to a mixer 276. In the mixer 276, the inputted beat signal is mixed with the signal from the frequency source 274,—a beat of a low frequency is generated which corresponds to the frequency difference between the beat frequency of the highest frequency of the measuring light in the beat signal and the signal from the frequency source 274. The beat of the low frequency is extracted by a filter 277 and guided to a phase frequency comparator 278 together with output of the filter 275. In the phase frequency comparator 278, phases of beat signals extracted from the filter 275 and the filter 277 are compared with each other, and a voltage or a current determined by a phase difference is outputted (t of FIG. 33). On the other hand, part of the input T and the input U divided after the inputting of the circuit 261 are guided to the filters 279 and 280 respectively and filtered so as to remain only the lowest beat signal frequency. Results of the filtering are subjected to phase comparison by a phase comparator 281, and a voltage or a current determined by a phase difference is outputted as output u from the circuit (u of FIG. 33).

Here, the filters 275, 277, 279, and 280 are each a band path filter, a low path filter, a high path filter, or a combination of them, and can be appropriately selected in view of a transmission rate, a band, and phase property. Used as the frequency source 274 can be, for example, a GPS signal or an atomic clock or a stabilization oscillator in accordance with required accuracy, and the frequency source 257 of FIG. 30 may be alternatively used.

Figure 34:
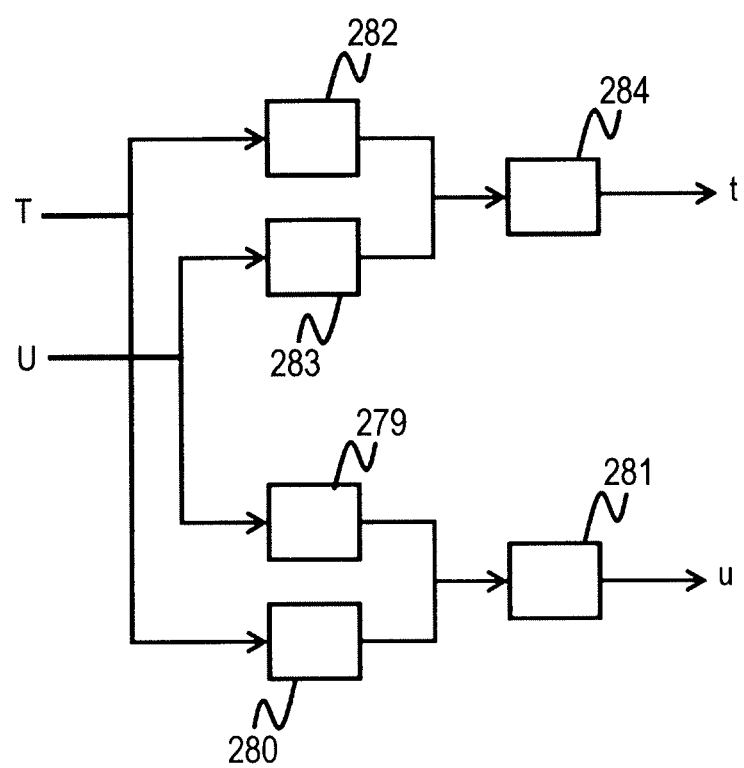
FIG. 34 is a diagram showing an example of circuit configuration.

FIG. 34 shows another configuration example of the circuit 261.

Depending on the phase frequency comparator and the band of the filter to be used, the beat signals of the measuring light and the reference light are not necessarily lowered to a low frequency by use of the frequency source 274, and phases of the beat signals generated by the photodetectors 255 and 258 may be directly compared with each other. In this case, as shown in FIG. 34, each of the input T or the input U is divided into two, only the beat signal determining the highest measurement accuracy is extracted, their frequencies are compared with each other in a phase frequency comparator 284, and a voltage or a current determined by a phase difference is outputted (t of FIG. 34). The low-frequency beat signal extraction and the phase comparison may be equal to those of the configuration example shown in FIG. 33.

Described in FIGS. 30 to 34 is a detailed configuration example of device configuration that three CW lasers are sued, beat signals of two frequencies are generated, and a phase difference between measuring light and reference light is measured to thereby measure distance to an object to be measured. In the invention, the number of CW lasers to be used is not limited to three, and the number of CW lasers can be increased as appropriate. Then control can be performed so as to provide a constant frequency difference between the n-number of CW lasers, a beat signal required for measurement can be extracted by filtering from beat signals generated by n!/2(n−2)!, and the distance to the object to be measured can be obtained based on the phase difference between the measuring light and the reference light in this frequency.

Based on the embodiment of the invention made by the inventor, the details are described above, but the invention is not limited to the embodiment described above, and it is needless to say that various modifications may be made within a range not departing from the spirits of the invention.

Industrial Applicability

The invention is applied to a distance measuring device for performing precise length and distance measurement in a field of a precision equipment and manufacturing a precisely machined member in mechanical industry and electric industry.

REFERENCE SIGNS LIST

7 . . . optical detector
8 . . . self beat
11 . . . reference light
12 . . . measuring light
13 . . . object to be measured
14 . . . phase difference
22 . . . beat signal corresponding to a frequency difference of the CW laser
23 . . . beat signal corresponding to a frequency difference between an optical comb and the CW laser
24 . . . beat signal corresponding to a frequency difference between the optical comb and the CW laser
25 . . . beat signal of beat signal of the optical comb and the CW laser
26 . . . beat signal of beat signal of the optical comb and the CW laser
101 . . . optical comb oscillator
102 . . . exciting light source
103 . . . optical fiber
104 . . . isolator
105 . . . output coupler
108 . . . photodetector
109 . . . filter
112 . . . frequency source
113 . . . frequency variable CW laser oscillator
114 . . . frequency variable CW laser oscillator
115 . . . CW laser driving circuit
116 . . . CW laser driving circuit
117 . . . fiber coupler
118 . . . output coupler
121 . . . photodetector
122 . . . filter
123 . . . circuit
124 . . . phase frequency comparator
125 . . . optical system
126 . . . object to be measured
128 . . . oscillator
129 . . . Atomic clock
130 . . . GPS signal
131 . . . antenna
153 . . . polygon mirror
163 . . . concave mirror The invention claimed in:

1. A device, comprising:
a first CW laser oscillator that oscillates a first CW laser;
a second CW laser oscillator that oscillates a second CW laser, where a frequency of the second CW laser is different than a frequency of the first CW laser;
a third CW laser coupled from the first and second CW lasers;
an optical comb oscillator;
a first circuit that extracts a first pair of beats from a reference CW laser and light from the optical comb oscillator and obtains a second pair of beats from the first pair of beats, wherein the reference CW laser is divided from the third CW laser;
a second circuit that extracts a third pair of beats from a detected CW laser and the light from the optical comb oscillator and obtains a fourth pair of beats from the third pair of beats, wherein the detected CW laser is divided from the third CW laser and reflected from an object;
a processor that calculates a phase difference between a phase of one of the second pair of beats and a phase of one of the fourth pair of beats.

2. The device according to claim 1,
wherein the object is illuminated with the third CW laser.

3. The device according to claim 1,
wherein the one of the second pair of beats and the one of the fourth pair of beats are a same kind of beat.

4. The device according to claim 1,
wherein the second pair of beats comprise a frequency difference between the first pair of beats and a sum of frequencies of the first pair of beats, and the fourth pair of beats comprise a frequency difference between the third pair of beats and a sum of frequencies of the third pair of beats.

5. A method, comprising:
generating a first CW laser;
generating a second CW laser, where a frequency of the second CW laser is different than a frequency of the first CW laser;
coupling the first and second CW lasers;
generating light from an optical comb oscillator;
extracting a first pair of beats from a reference CW laser and light from the optical comb oscillator and obtains a second pair of beats from the first pair of beats, wherein the reference CW laser is divided from the coupled CW laser;
extracting a third pair of beats from a detected CW laser and the light from the optical comb oscillator and obtains a fourth pair of beats from the third pair of beats, wherein the detected CW laser is divided from the coupled CW laser and reflected from an object;

calculating a phase difference between a phase of one of the second pair of beats and a phase of one of the fourth pair of beats.

6. The method according to claim 5,
wherein the object is illuminated with the coupled CW laser.

7. The method according to claim 5,
wherein the one of the second pair of beats and the one of the fourth pair of beats are a same kind of beat.

8. The method according to claim 6,
wherein the second pair of beats comprise a frequency difference between the first pair of beats and a sum of frequencies of the first pair of beats, and the fourth pair of beats comprise a frequency difference between the third pair of beats and a sum of frequencies of the first pair of beats.

* * * * *